United States Patent
White et al.

(10) Patent No.: US 9,990,618 B2
(45) Date of Patent: Jun. 5, 2018

(54) CASH CARD SYSTEM

(71) Applicant: MasterCard International Incorporated, Purchase, NY (US)

(72) Inventors: Robert White, Brentwood (GB); Robert K. Walls, Huntleys Cove (AU); Shuan Ghaidan, Fairlight (AU); Machael J. Cowen, London (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 281 days.

(21) Appl. No.: 14/591,388

(22) Filed: Jan. 7, 2015

(65) Prior Publication Data

US 2015/0134469 A1  May 14, 2015

Related U.S. Application Data

(63) Continuation of application No. 12/917,767, filed on Nov. 2, 2010, and a continuation-in-part of application No. 12/480,060, filed on Jun. 8, 2009, now Pat. No. 8,341,084, and a continuation-in-part of application No. 12/690,372, which is a continuation of application No. PCT/US2009/056902, filed on Sep. 15, 2009.

(Continued)

(51) Int. Cl.
| | | |
|---|---|---|
| *G06Q 20/20* | (2012.01) | |
| *G06Q 20/34* | (2012.01) | |
| *G06Q 30/06* | (2012.01) | |
| *G06Q 20/40* | (2012.01) | |
| *G06Q 20/10* | (2012.01) | |
| *G06Q 20/28* | (2012.01) | |

(52) U.S. Cl.
CPC ......... *G06Q 20/204* (2013.01); *G06Q 20/105* (2013.01); *G06Q 20/20* (2013.01); *G06Q 20/28* (2013.01); *G06Q 20/34* (2013.01); *G06Q 20/349* (2013.01); *G06Q 20/40* (2013.01); *G06Q 30/06* (2013.01)

(58) Field of Classification Search
None
See application file for complete search history.

(56) References Cited

U.S. PATENT DOCUMENTS 5,987,438 A * 11/1999 Nakano ............... G06K 7/0013
235/375
6,634,549 B1 * 10/2003 Matsumoto .......... G06Q 20/105
235/375

(Continued)

*Primary Examiner* — Robert R Niquette
(74) *Attorney, Agent, or Firm* — Buckley, Maschoff & Talwalkar LLC

(57) ABSTRACT

A method includes a point of sale (POS) terminal receiving transaction data indicative of a purchase transaction, and detecting, by a card interface associated with the POS terminal, the presence of an integrated circuit (IC) payment card. The process also includes the POS terminal receiving indications of a plurality of data objects stored in the IC payment card, selecting a payment application based at least in part on the transaction data and the indications of the plurality of data objects, retrieving an account number associated with the selected payment application, and then executing the selected payment application to handle the purchase transaction.

13 Claims, 25 Drawing Sheets

Related U.S. Application Data

(60) Provisional application No. 61/310,791, filed on Mar. 5, 2010, provisional application No. 61/097,781, filed on Sep. 17, 2008.

(56) References Cited

U.S. PATENT DOCUMENTS

| | | | |
|---|---|---|---|
| 8,016,192 B2 * | 9/2011 | Messerges | G06Q 20/10 235/379 |
| 2003/0222138 A1 * | 12/2003 | Oppenlander | G06Q 20/10 235/380 |
| 2008/0147508 A1 * | 6/2008 | Liu | G06Q 20/204 705/17 |
| 2009/0050688 A1 * | 2/2009 | Kon | G06Q 20/042 235/375 |
| 2009/0050689 A1 * | 2/2009 | Sako | G06O 20/0658 235/375 |
| 2009/0112766 A1 * | 4/2009 | Hammad | G06Q 20/10 705/44 |

* cited by examiner

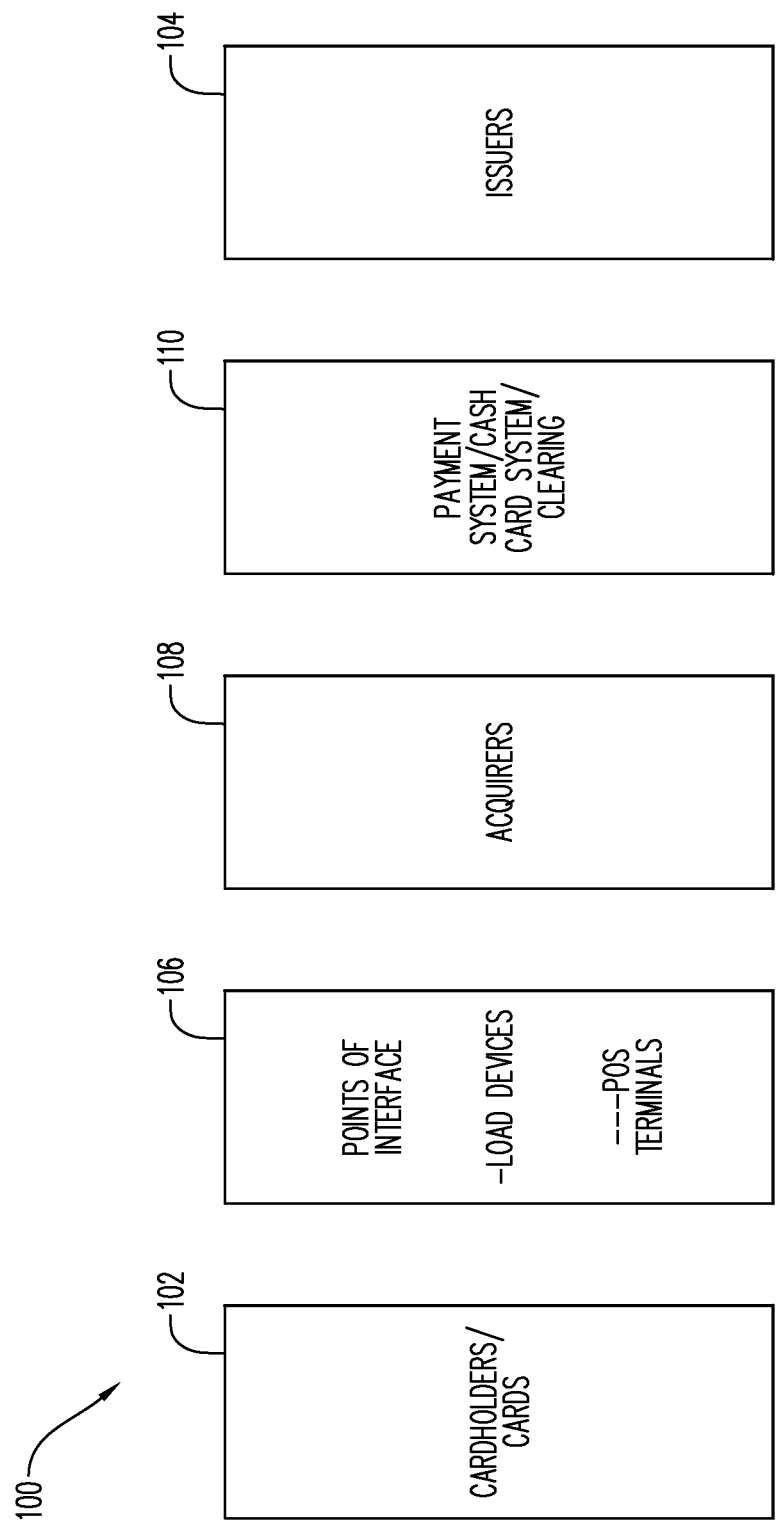

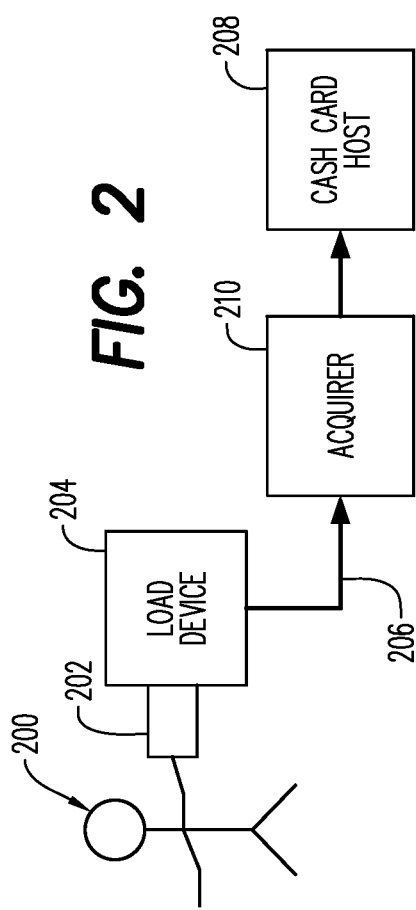
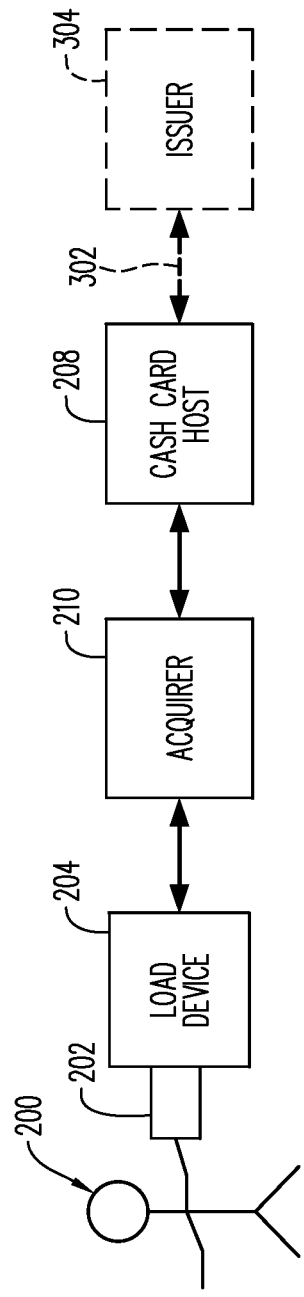

CASH CARD SYSTEM

CROSS-REFERENCE TO RELATED APPLICATIONS

This application is a continuation application of U.S. patent application Ser. No. 12/917,767, filed on Nov. 2, 2010, which claims the benefit of U.S. provisional patent application Ser. No. 61/310,791, filed Mar. 5, 2010; further, this application is a continuation-in-part of U.S. utility patent application Ser. No. 12/480,060 filed Jun. 8, 2009; also, this application is a continuation-in-part of U.S. utility patent application Ser. No. 12/690,372, filed Jan. 20, 2010, which is a continuation of PCT application serial no. PCT/US2009/056902, filed Sep. 15, 2009, which designated the United States, and which claimed the benefit of U.S. provisional patent application Ser. No. 61/097,781, filed Sep. 17, 2008. All of the applications referred to in this paragraph are incorporated herein by reference.

BACKGROUND

Payment cards such as credit or debit cards are ubiquitous. For decades, such cards have included a magnetic stripe on which the relevant account number is stored. To consummate a purchase transaction with such a card, the card is swiped through a magnetic stripe reader that is part of a point of sale (POS) terminal. The reader reads the account number from the magnetic stripe. The account number is then used to route a transaction authorization request that is initiated by the POS terminal. The authorization request is routed from the merchant's acquiring financial institution ("acquirer") to a server computer operated by or on behalf of the issuer of the payment account. The issuer's server computer provides a response to the authorization request. If the response indicates that the issuer has authorized the transaction, the transaction is consummated at the point of sale. Later the transaction is cleared for settlement via the acquirer and the issuer.

More recently, cards that incorporate an integrated circuit (IC) have been utilized as payment cards. One well known IC payment card standard is referred to as "EMV", and utilizes an IC card (also known as a "smart card") that is interfaced to a POS terminal via contacts on the IC card. During a purchase transaction, the payment card account number and other information may be uploaded from the IC payment card to the POS terminal via the IC card contacts and a contact card reader that is included in the POS terminal. Authorization and clearing may then proceed in substantially the same manner as for a transaction initiated with a mag stripe payment card (putting aside additional security measures that may be implemented by using the processing capabilities of the IC payment card and chip data in the clearing).

In other IC payment card systems, the exchange of information between the card and the POS terminal proceeds via wireless RF (radio frequency) communications. These wireless communication payment cards are sometimes referred to as "contactless" payment cards. One example of a contactless payment card standard is referred to in the United States by the brand name "PayPass" and was established by MasterCard International Incorporated, the assignee hereof.

In addition to debit and credit IC payment cards, there are also so-called "pre-authorized" cards. These cards are not necessarily linked to a credit card account or to a bank account from which debits are made via the payment card system. Rather, pre-authorized cards are loaded ("topped-up") from time to time with monetary value, and the cards are used to make purchases based on deductions from the value stored in the cards. The resulting purchase transactions may be referred to as "off-line purchase transactions" in the sense that the POS terminal does not request an on-line authorization from the card issuer computer before the purchase transaction is consummated. Merchants that accept pre-authorized cards may submit purchases transactions for subsequent clearing against a "shadow account" for the pre-authorized card via the clearing system operated by the payment card system.

When it is necessary to top-up a pre-authorized card, the card may be interfaced to a terminal or kiosk, typically via a contact interface. The user may interact with the terminal to obtain authorization from a central server to have more monetary value loaded into the pre-authorized card.

In contradistinction to "off-line" purchase transactions, as described in the previous paragraph, conventional payment system purchase transactions that require real-time online communication with the account issuer—for the purpose of authorization or (in a "one message" system) for immediate charge against the customer's account—may be referred to as "online purchase transactions".

To the extent that a payment device is used for off-line, pre-authorized purchase transactions, it in effect functionally mimics a pre-paid or stored value card, at least in terms of what occurs at the point of sale.

The present inventors now disclose herein certain techniques that may facilitate operation of a payment system that supports pre-authorized and cleared payment cards.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein:

FIG. 1 is a block diagram that schematically illustrates major components of a payment card system in which the present invention may be applied.

FIG. 2 is a block diagram that schematically illustrates an off-line load transaction provided in accordance with aspects of the present invention.

FIG. 3 is a block diagram that schematically illustrates an on-line load transaction provided in accordance with aspects of the present invention.

DETAILED DESCRIPTION

Figure 4:
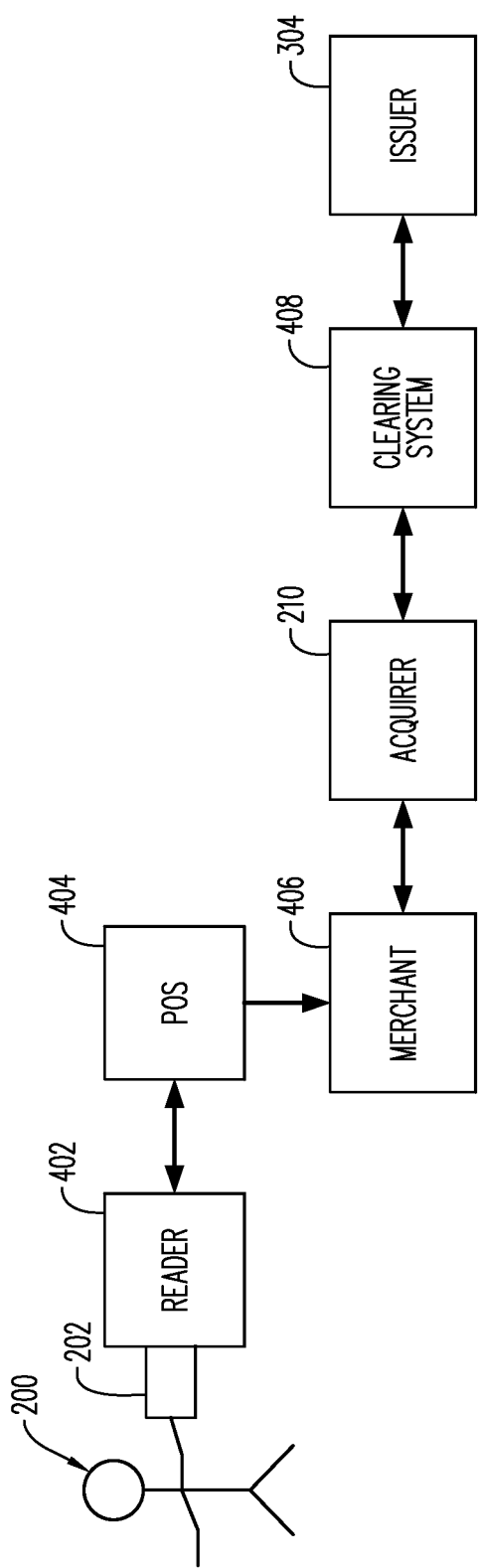
FIG. 4 is a block diagram that schematically illustrates a typical purchase transaction performed in the system of FIG. 1.

In general, and for the purpose of introducing concepts of embodiments of the present invention, a system for pre-authorized and cleared payment cards supports various features that facilitate operation of the system. (Hereinafter, pre-authorized and cleared payment cards may sometimes be referred to as "cash cards".) Some aspects of the invention may also be embodied in payment card systems that do not include cash card FIG. 1 is a block diagram that schematically illustrates major components of a payment card system 100 in which the present invention may be applied.

Block 102 in FIG. 1 represents consumers/cardholders and the cash cards that they carry for use with the payment card system 100.

Block 104 in FIG. 1 represents financial institutions that issue the cash cards.

Block 106 in FIG. 1 represents so-called "point of interaction" (POI) devices such as POS terminals or load devices. The POI devices may be present at retail stores and/or bank branches and may be suitable for having cash cards interfaced thereto for the purpose of performing purchase transactions and/or load transactions.

Block 108 in FIG. 1 represents financial institutions ("acquirers") that have relationships with merchants or service providers and that provide a connection between the POI devices and the payment card system at large.

Block 110 represents centralized and/or network components of the payment card system such as may be operated by or on behalf of a payment card association such as the assignee hereof. Components represented by block 110 may include (a) a transaction routing system such as the well-known "Banknet" system operated by the assignee hereof, (b) a transaction clearing system such as the "Global Clearing Management System" (GCMS) operated by the assignee hereof, and (c) a cash card system host computer as described below.

The left-to-right arrangement of blocks 102, 106, 108, 110 and 104 is intended to suggest a general transaction flow (for an online transaction) from card/cardholder, through POI device, acquirer and network to the issuer. More detailed transaction flows for various types of transactions will be described below in conjunction with other drawings.

FIG. 2 is a block diagram that schematically illustrates an off-line load transaction provided in accordance with aspects of the present invention.

In FIG. 2, a cardholder 200 is shown interfacing a cash card 202 to a load device 204 for the off-line load transaction. The purpose of this transaction is to increment the pre-authorized balance stored in the cash card 202 so that the cash card 202 may be used for subsequent off-line purchase transactions. Typically, the load transaction is funded by the cardholder 200 delivering cash to an attendant (not shown) who operates the load device 204 and who may be, for example, a bank employee or a retail store employee. The amount of cash delivered by the cardholder 200 may be sufficient to cover the amount loaded into the cash card 202 plus a transaction fee.

At 206 in FIG. 2 a signal path is indicated by which (e.g., via a batch process) the load device 204 subsequently notifies a cash card system host computer 208 of the load transaction via an acquiring financial institution (acquirer) 210. Based on the notification, the cash card system host computer 208 updates a clearing file for the cash card 202 to be used for the subsequent purchase transactions made with the cash card 202. During the load transaction itself, the load device 204 is not in communication with any remote device. In a subsequent clearing transaction (not illustrated in FIG. 2), the amount of the load is cleared from the account of the merchant (or other entity) which operates the load device via the payment card system to the issuer of the cash card 202.

In some cases the load transaction illustrated in FIG. 2 may also include initial activation of the cash card 202. For example, the merchant may have a supply of unactivated cash cards on hand available for purchase and loading by would-be cardholders. The load device 204 may operate to activate the card in addition to performing the initial load, and may notify the cash card system host computer 208 of activation of the cash card 202 in addition to providing notification to the cash card system host computer 208 of the load transaction.

One advantage of the off-line nature of the load transaction is that it may in some cases be performed at a temporary merchant location, on a cruise ship or at some other location which lacks infrastructure to support real-time on-line communication with the payment card system/card issuer/cash card system host computer 208 and/or in situations where the permitted time for the transaction is short.

FIG. 3 is a block diagram that schematically illustrates an on-line load transaction provided in accordance with aspects of the present invention.

As in FIG. 2, FIG. 3 again shows the cardholder 200 interfacing the cash card 202 to a load device 204. However, in the load transaction illustrated in FIG. 3, the load device 204 is in on-line communication during the transaction with the cash card system host computer 208 via the acquirer 210. The on-line load transaction shown in FIG. 3 may be funded by a cash payment from the cardholder 200, as in the off-line load transaction shown in FIG. 2. Alternatively, in a case where the cash card 202 is linked to a bank account/credit card account owned by the cardholder 200, then the funding may come from the linked account via a funding transaction (indicated at 302) with the card issuer (issuing financial institution) 304.

FIG. 4 is a block diagram that schematically illustrates a typical purchase transaction performed in the payment card system 100.

FIG. 4 shows the cardholder 200 interfacing the cash card 202 to the reader component 402 (proximity or contact reader) of a POS terminal 404. Subsequently, the transaction is cleared from the issuer 304 via the merchant's computer 406, the acquirer 210 and a clearing system 408. The purchase transaction itself is handled on an off-line basis, with clearing later handled in a batch mode (e.g., at the end of the day).

Figure 5:
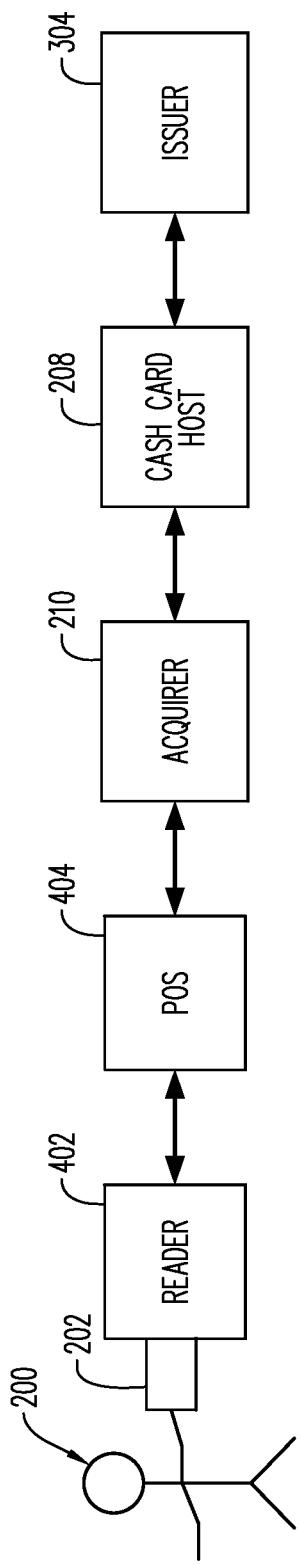
FIG. 5 is a block diagram that schematically illustrates another example of a purchase transaction that may be performed in the system of FIG. 1 in accordance with aspects of the present invention.

FIG. 5 is a block diagram that schematically illustrates another example of a purchase transaction that may be performed in the payment card system 100 in accordance with aspects of the present invention. For purposes of FIG. 5, it is assumed that the purchase transaction is in an amount that exceeds the current pre-authorized balance in the cash card 202, so that an on-line load transaction is also included to allow the purchase transaction to go through. It is further assumed for purposes of FIG. 5 that the POS terminal 404 has capabilities for on-line real-time communication with the acquirer 210.

Thus FIG. 5 again shows the cardholder 200 interfacing the cash card 202 to the reader component 402 of the POS terminal 404. Authorization for the load transaction proceeds by request from the POS terminal 404 to the cash card system host computer 208 via the acquirer 210. Authorization for funding of the load transaction from a linked account proceeds by request from the cash card system host computer 208 to the issuer 304. The purchase transaction itself may be subsequently cleared via the pathway illustrated in FIG. 4.

Figure 5A:
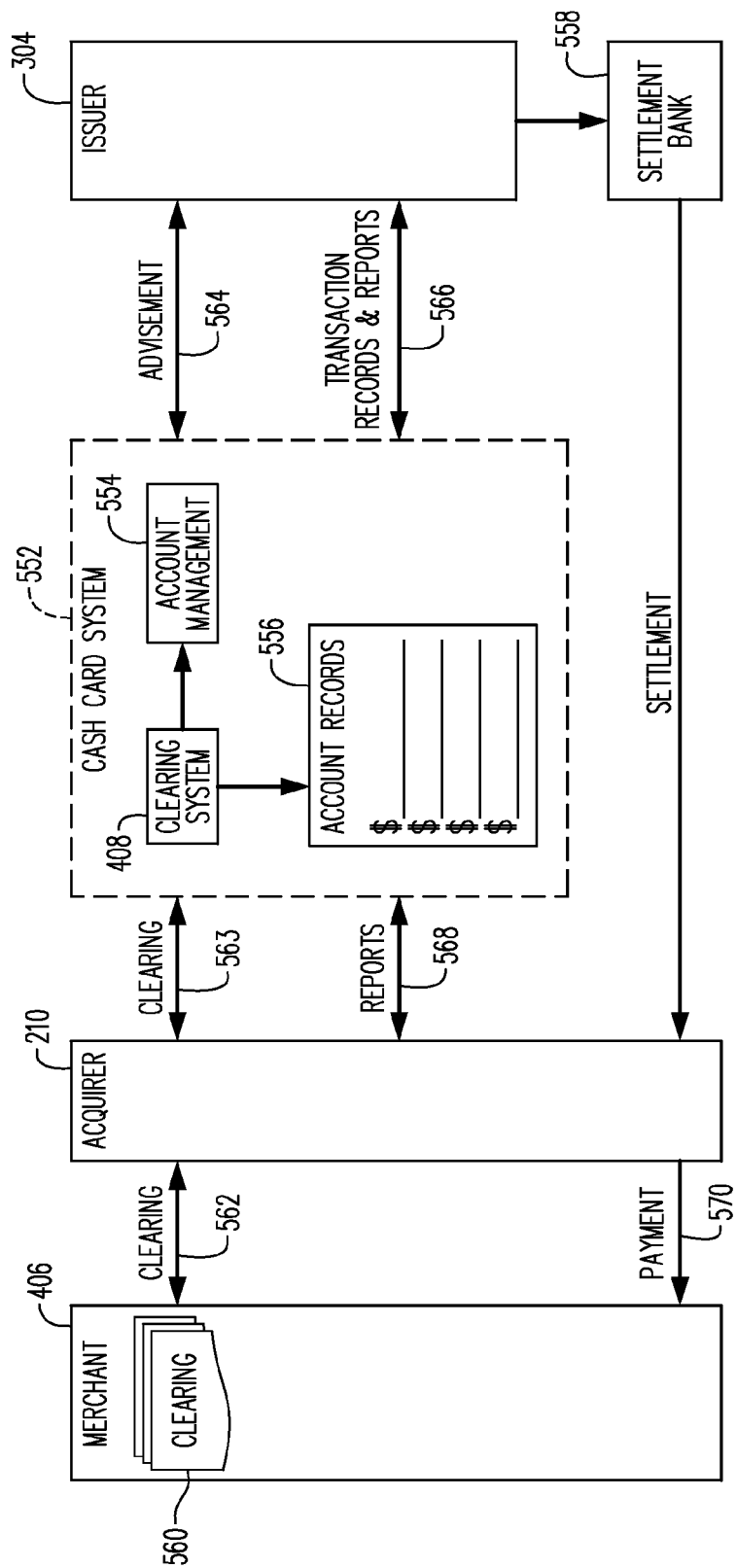
FIG. 5A is a block diagram that schematically illustrates transaction clearing and other functions of the system of FIG. 1.

FIG. 5A is a block diagram that schematically illustrates transaction clearing and other functions of the payment card system 100.

FIG. 5A shows the merchant computer 406 in communication with the acquirer (acquirer computer) 210. Block 552 in FIG. 5A represents central cash card system components, including the clearing system 408, a cash card account management system 554 and an account record data store 556. (In some embodiments, the central cash card system components 552 may at least partly be constituted by the cash card system host computer 208 shown in FIGS. 2 and 3.) The central cash card system components 552 are in communication with the acquirer computer 210 and with the issuer (issuer computer) 304. Also shown in FIG. 5A is a settlement bank 558, which serves as a conduit for settlement of the clearing transactions from the issuer 304 to the acquirer 210.

Although only one merchant, one acquirer and one issuer are shown in FIG. 5A (all assumed to be involved with a single clearing transaction), in practice the payment card system 100 may include numerous merchants, as well as a considerable number of acquirers and issuers. Financial institutions that serve as acquirers for some transactions may also act as issuers with respect to other transactions. A given acquirer may serve numerous merchants.

As seen from FIG. 5A, a clearing file 560 generated in the merchant computer 406 is communicated from the merchant computer 406 to the acquirer computer 210 via an exchange of clearing messages indicated at 562. Further clearing messages are exchanged at 563 between the acquirer computer 210 and the clearing system 408. Clearing of the transaction is reflected for the cash card in question in the card account management system 554. A record of the transaction is kept in account record data store 556. The issuer 304 is advised of the clearing transaction by the card account management system 554 in advisement communications 564. Transaction records and reports are made available to the issuer 304 from the account record data store 556 as indicated at 566. Reports of clearing activities are also made available from the account record data store to the acquirer 210, as indicated at 568. Upon settlement of the clearing transaction, payment for the underlying purchase transaction is made from the acquirer 210 to the merchant 406, as indicated at 570.

Figure 6:
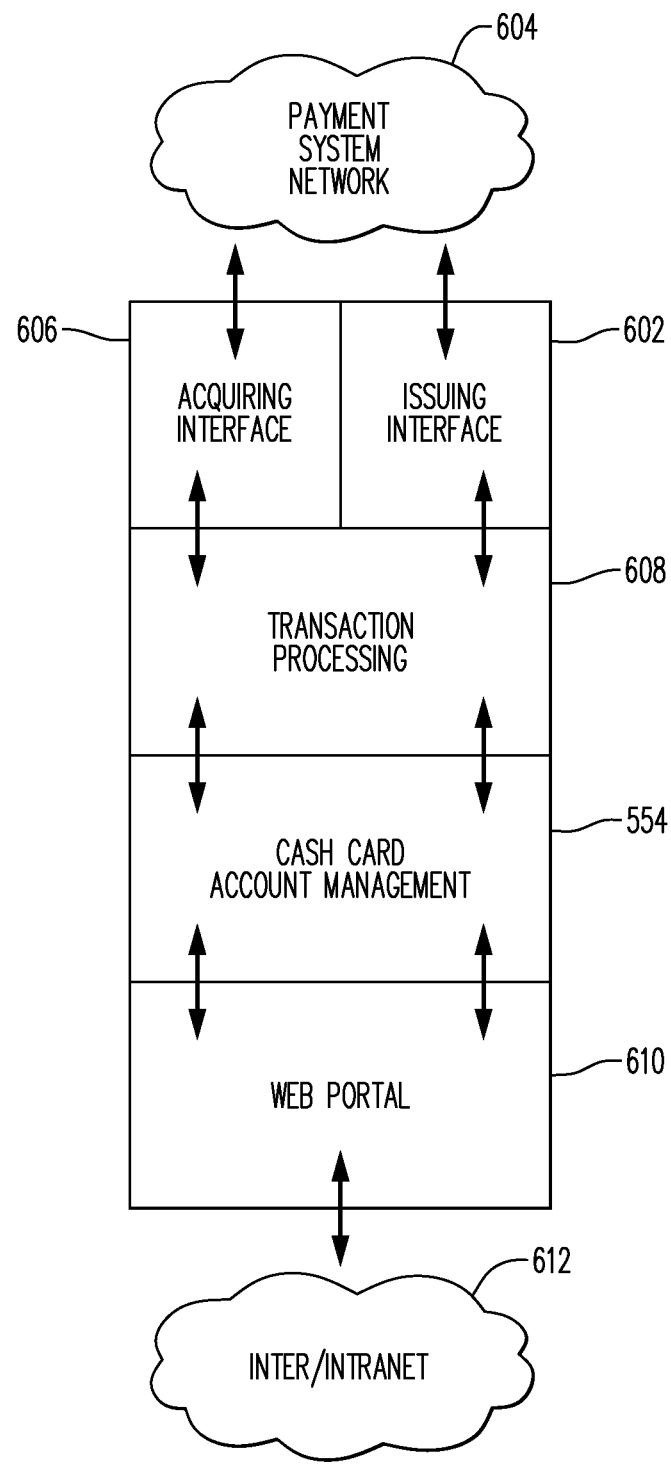
FIG. 6 is a high-level functional block diagram that illustrates a cash card system host computer that is part of the system of FIGS. 1 and 5A and that is provided in accordance with aspects of the present invention.

FIG. 6 is a high-level functional block diagram that illustrates an embodiment of a cash card system host computer 208 that is part of the payment card system 100 and that is provided in accordance with aspects of the present invention.

Block 602 in FIG. 6 represents an aspect of the cash card system host computer 208 which functions as an interface with respect to requests for which the cash card system host computer 208 acts in an issuer mode. These requests are received by the cash card system host computer 208 via the payment system network 604 and may include, for example, requests for scripts to load funds into cash cards. These requests may have originated, for example, from load devices as referred to above. It will be noted that this issuer interface 602 couples the cash card system host computer 208 to the payment system network 604. As described below, the requests handled by the cash card system host computer 208 may also include requests to update status data that is stored in the cash cards. These requests also may be serviced with suitable scripts downloaded from the cash card system host computer 208 to the cash cards.

Block 606 in FIG. 6 represents an aspect of the cash card system host computer 208 which functions as an interface with respect to requests that the cash card system host computer 208 generates in its role as an acquirer. Typically, these requests are for the purpose of requesting funding transactions from credit or debit accounts that are linked to cash cards. These requests are dispatched by the cash card system host computer 208 via the payment system network 604 and are routed via the payment system network 604 to the issuer of the cash card and/or the linked credit/debit account. Like the issuer interface 602, the acquirer interface 606 couples the cash card system host computer 208 to the payment system network 604.

Block 608 in FIG. 6 represents transaction processing capabilities of the cash card system host computer 208 and is functionally linked to the interfaces 602, 606. The transactions processed by block 608 may include load requests, status data update requests, outgoing funding requests in the case of linked load transactions, and clearing of purchase transactions.

Block 554 in FIG. 6, like the block bearing the same reference numeral in FIG. 5A, represents a card account management system. The card account management system 554 supports "shadow accounts" for the individual cash cards. These shadow accounts reflect fund loads into the cash cards and purchase transactions by the cash cards, and are utilized for clearing the purchase transactions. The cash card system illustrated herein is a fully accounted system, and the card account management system 554 is the vehicle for the requisite accounting. It will be noted that the card account management system 554 is functionally coupled to the transaction processing block 608 of the cash card system host computer 208.

Block 610 in FIG. 6 represents capabilities of the cash card system host computer 208 for hosting a web portal, and is coupled to a data network such as an intranet or the Internet (indicated by reference numeral 612). Web portal block 610 is also functionally coupled to the card account management system 554. The web portal provided by block 610 is a vehicle for providing reports to acquiring and issuing financial institutions that participate in the cash card system. In some embodiments, the web portal also facilitates customer service provided directly to cardholders.

Figure 7:
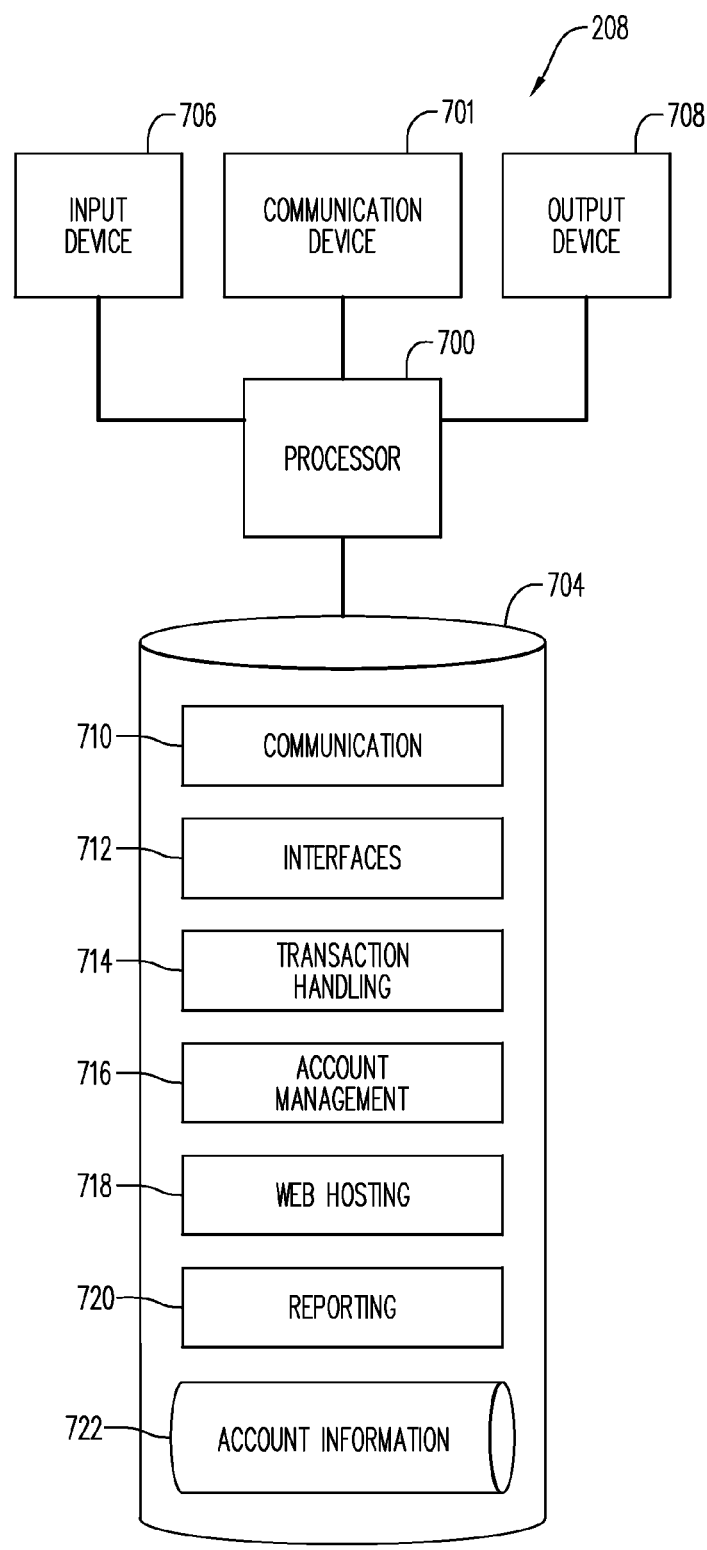
FIG. 7 is another block diagram representation of the cash card system host computer shown in FIG. 6.

FIG. 7 is another block diagram representation of the cash card system host computer 208, showing in particular some hardware and software aspects of the cash card system host computer 208.

The cash card system host computer 208 may be conventional in its hardware aspects but may be controlled by software to cause it to function as described herein. For example, the cash card system host computer 208 may be constituted by conventional server computer hardware.

The cash card system host computer 208 may include a computer processor 700 operatively coupled to a communication device 701, a storage device 704, an input device 706 and an output device 708.

The computer processor 700 may be constituted by one or more conventional processors. Processor 700 operates to execute processor-executable steps, contained in program instructions described below, so as to control the cash card system host computer 208 to provide desired functionality.

Communication device 701 may be used to facilitate communication with, for example, other devices (such as the payment system network, acquirer computers and issuer computers). For example, communication device 701 may comprise numerous communication ports (not separately shown), to allow the cash card system host computer 208 to communicate simultaneously with a number of other computers or other devices.

Input device 706 may comprise one or more of any type of peripheral device typically used to input data into a computer. For example, the input device 706 may include a keyboard and a mouse. Output device 708 may comprise, for example, a display and/or a printer.

Storage device 704 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 704 stores one or more programs for controlling processor 700. The programs comprise program instructions (which may be referred to as computer readable program code means) that contain processor-executable process steps of the cash card system host computer 208, executed by the processor 700 to cause the cash card system host computer 208 to function as described herein.

The programs may include a communication application 710 that controls the processor 700 to enable the cash card system host computer 208 to engage in data communication with other computers in a conventional manner. The programs may further include programs (represented by block 712) for implementing the acquirer and issuer interfaces referred to above in connection with FIG. 6. These interfaces may, for example, be implemented generally in accordance with conventional practices related to acquirer and issuer messaging interfaces for payment systems.

The programs stored in the storage device 704 may also include a transaction handling application 714 that controls the processor 700 to enable the cash card system host computer 208 to handle various transactions, including load requests, status data update requests, clearing of purchase transactions by cash cards, and initiating authorization requests for funding of linked load requests.

Another program that may be stored on the storage device 704 is an account management application 716. The account management application 716 implements the card account management system that was referred to above.

The programs stored on the storage device 704 may further include a web hosting program 718 which implements the web portal referred to above in connection with FIG. 6. In addition, the programs stored on the storage device 704 may include a reporting program 720 which generates reports to be provided by the cash card system host computer 208 to acquirer and issuer computers and possible for other purposes as well.

Block 722 in FIG. 7 represents a database of information relating to the cash card accounts managed via the cash card system host computer 208.

The storage device 704 may also store, and the cash card system host computer 208 may also execute, other programs, which are not shown. The other programs may include, e.g., one or more conventional operating systems, device drivers, etc. The storage device 704 may also store data required for operation of the cash card system host computer 208 in addition to the account information database 722 referred to above. The other data may include, for example, a database relating to transactions handled by the cash card system host computer 208.

Although only a single cash card system host computer 208 has been referred to up to now, it should be understood that the functions performed by the cash card system host computer 208 may in practice be divided among two or more cooperating computer systems. Accordingly, when the term "computer" is used herein or in the appended claims, that term should be understood to include one computer or two or more cooperating computers. Similarly, the term "processor" should be understood to include one processor or two or more cooperating processors.

Figure 8:
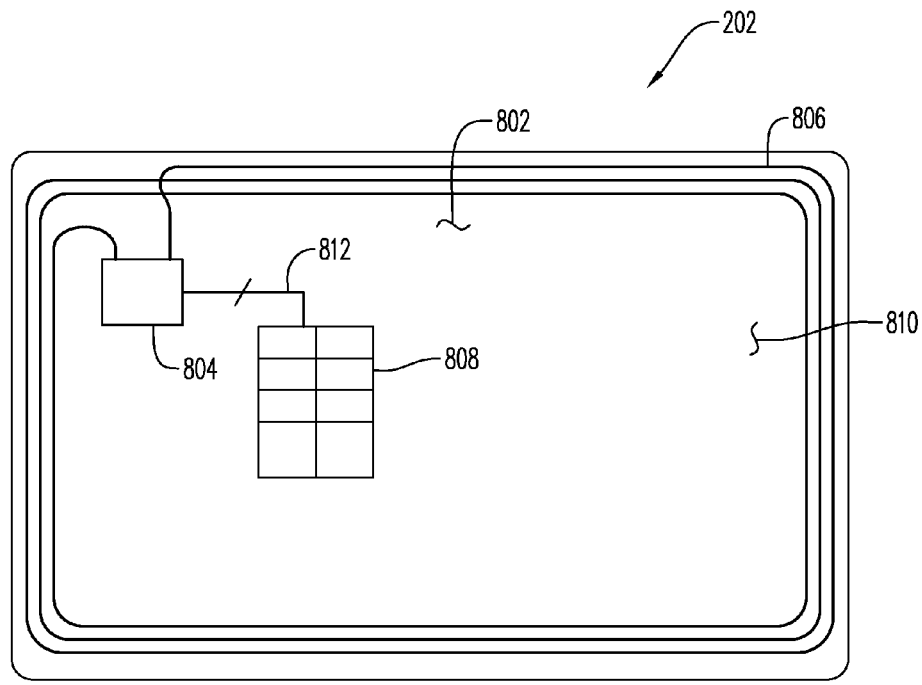
FIG. 8 schematically illustrates hardware aspects of a typical IC card used as a payment card in the system of FIG. 1.

FIG. 8 schematically illustrates hardware aspects of a typical IC card used as a cash card 202 in the payment card system 100. The cash card 202 may include a card-shaped body 802, which may or may not resemble conventional payment cards in shape and size. The card-shaped body 802 may be formed of plastic or another suitable material.

The cash card 202 may also include an IC 804. The IC 804 may be mounted and/or installed in any suitable manner in the card-shaped body 802. For example, the IC 804 may be embedded (partially or completely) in the card-shaped body 802. The IC 804 may be suitably designed and configured to transmit cash card account information by radio frequency signaling and/or via a contact data signal path to a POS terminal. The cash card 202 may further include an antenna 806 embedded in or otherwise mounted on the card-shaped body 802. As shown, the antenna 806 may be in the form of several loops arranged along the periphery of the card-shaped body. Alternatively, the antenna 806 may be of a different type and/or configuration. The antenna may be operative generally in accordance with a known standard for contactless IC cards to receive interrogation and power signals (which may be the same signal) from a proximity coupling device of a POS terminal and to transmit cash card account number information and/or other information to the proximity coupling device.

In addition, the cash card 202 may include a set of conductive contacts 808 located on a front surface 810 of the card-shaped body 802. The contacts may be coupled to the IC 804 via a suitable arrangement of signal path connections indicated at 812. The contacts 808 may be positioned and laid out on the cash card 202 in accordance with a well-known standard for contact IC cards.

It will be appreciated that the cash card 202 is operable as both a contactless and a contact IC card. The IC 804 may be designed and configured to operate in accordance with an appropriate standard for IC cards, such as the above-mentioned EMV standard.

In some embodiments, lettering (not shown) or other symbols (not shown) may be present on the front surface 810 of the card-shaped body 802 and/or on the rear surface (not shown) of the card-shaped body 802. Still further, the front surface 802 of the card-shaped body 102 may carry one or more logos and/or brands, including for example the brand/logo of a payment card association such as MasterCard International Incorporated. The brand/logo of the issuer may also be present, as well as, for example, a specific card product brand. In addition, the cash card 202 may include other features commonly found on a payment card. In some embodiments, the IC 804 may be programmed and/or configured to allow the cash card 202 also to operate as a conventional debit or credit (and/or ATM) card for conventional transactions that access a payment card account that is different from the shadow account for the cash card 202. That is, for conventional credit and/or debit card purchase transactions, the cash card 202 (in functioning as a credit or debit card) may transmit a payment card account number other than the account number that is associated with the cash card 202 in its role in the cash card system.

In some embodiments, the cash card 202 may also include a conventional magnetic stripe (not shown). With this feature the cash card 202 may be usable as a conventional mag stripe debit or credit (and/or ATM) card, in addition to its functions for the pre-authorized, cleared payment applications described herein.

Figure 8A:
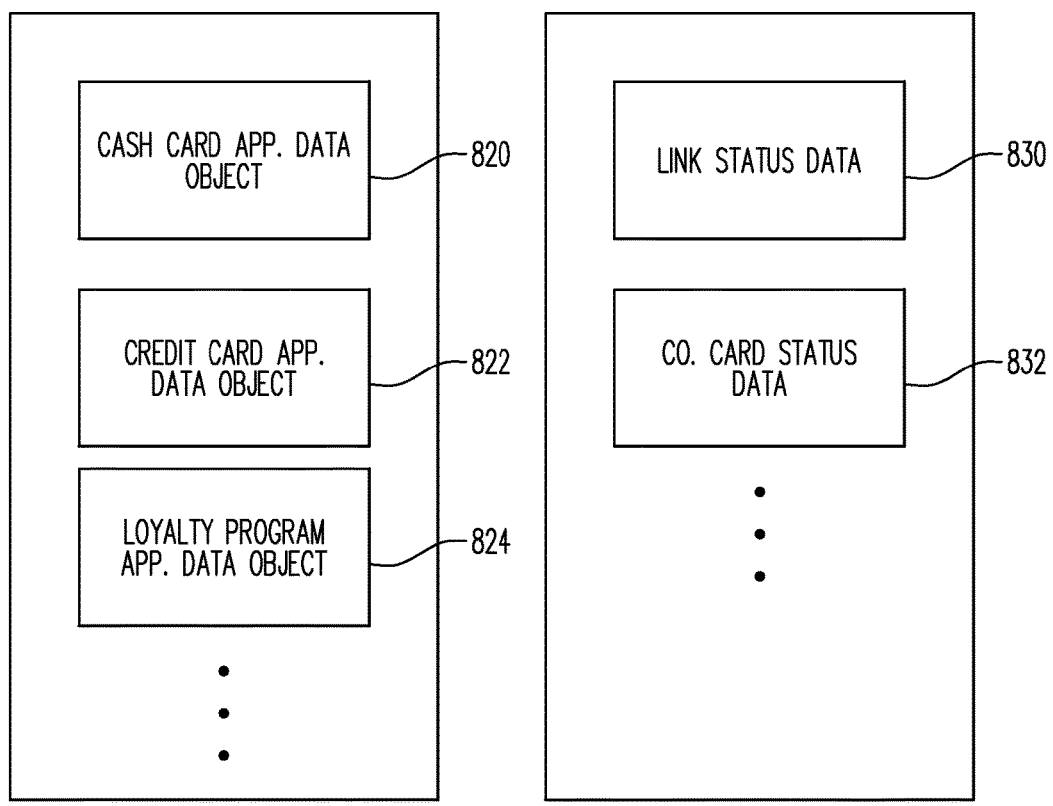
FIG. 8A is a diagram that schematically represents data and/or data objects that may be stored in the IC payment card of FIG. 8 in accordance with aspects of the present invention.

FIG. 8A is a diagram that schematically represents data and/or data objects that may be stored in the cash card 202 in accordance with aspects of the present invention.

In the example illustrated in FIG. 8A, the cash card 202 is configured to operate with more than one payment card application. For example, the cash card 202 may be configured to operate with a cash card application, a credit (or debit) card application, and a loyalty program card application. Thus, block 820 represents a data object or profile that is stored in the IC 804 and is associated with a cash card application. The data object 820 may, for example, include a payment card account number that is associated with the cash card 202 in connection with the cash card application and that is read from the cash card 202 when the cash card 202 is used for a cash card transaction.

Block 822 represents a data object or profile that is stored in the IC 804 and is associated with a credit card application. The data object 822 may, for example, include a payment card account number that is associated with the cash card 202 in connection with the credit card application and that is read from the cash card 202 when the cash card 202 is used for a credit card transaction.

Block 824 represents a data object or profile that is stored in the IC 804 and is associated with a loyalty program card application. The data object 824 may, for example, include a loyalty program account number that is assigned to the holder of the cash card 202. The loyalty program account number may be read from the cash card 202 to credit a purchase transaction to the cardholder's loyalty program account.

Also shown in FIG. 8A is a block 830 that represents link status data. As described in more detail below in connection with block 304 in FIG. 13 and with FIGS. 15-17, the link status data provides a link status indication, from which it is determined whether load transactions for the cash card may be funded from a credit or debit account linked to the cash card.

FIG. 8A also shows a block 832 that represents status data indicative of a status of a company credit or debit card account provided by the employer of the cardholder and accessible via the cash card 202. As will be understood from subsequent discussion, the status data 832 may indicate one or more types of transactions that qualify or do not qualify for use of the cash card 202.

In addition to or instead of the status data represented by blocks 830 and 832 in FIG. 8A, the cash card 202 may store other indicators/flags, such as, for example, an indicator that indicates that the cash card 202 is backed by risk mitigation data (e.g., the card holder's name and/or address and/or the number of the card holder's debit or credit card account), as described in the above-referenced '060 patent application.

Figure 9:
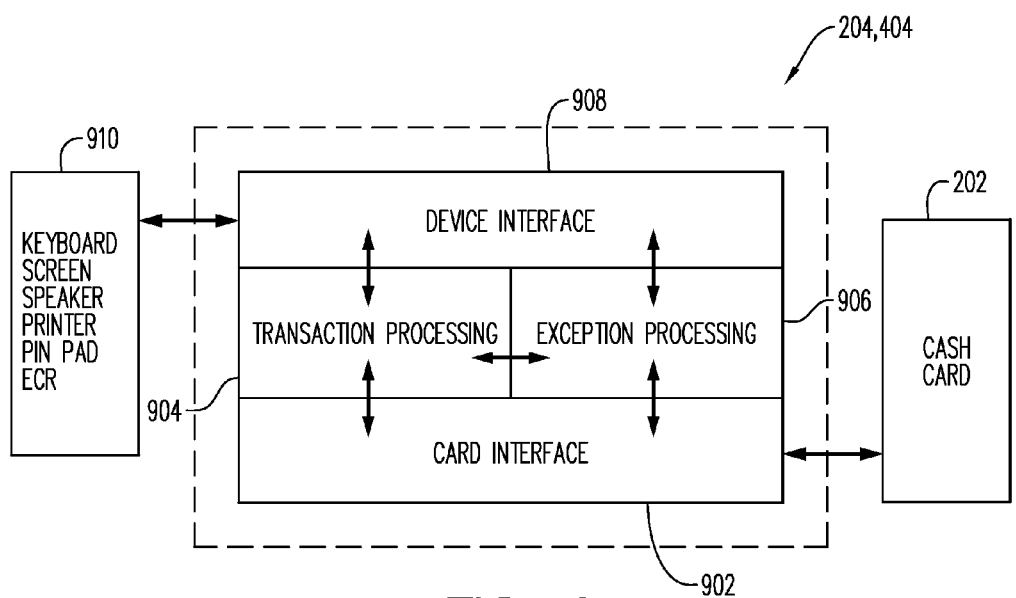
FIG. 9 is a high-level functional block diagram representation of a typical POS terminal or load terminal that is included in the system of FIG. 1.

FIG. 9 is a high-level functional block diagram representation of a typical POS terminal 404 or load terminal 204 that is included in the payment card system 100. Either or both of these devices may be referred to generically as a "point of interaction" (POI) device.

One element of the POI device depicted in FIG. 9 is a card interface, represented by block 902. The card interface 902 may, for example, take the form of a conventional RF (contactless) interface and/or a conventional contact interface for an IC card. In some embodiments, purchase transactions may be performed via either a contact or a contactless I/F, whereas it may be desirable to perform load transactions only via a contact I/F. That is, due to the potentially longer-duration required interaction between the cash card 202 and the POI device during a load transaction, it may be best if the contact I/F were used to assure that the communication channel between the POI device and the cash card 202 remains unbroken while the load transaction takes place.

Block 904 in FIG. 9 represents transaction processing capabilities of the POI device. It will be observed that transaction processing block 904 is coupled to the card interface 902. Information exchanged with the cash card 202 via the card interface 902 may be received by the transaction processing block 904 or may have been generated by the transaction processing block 904. Some operations of the transaction processing block 904 may be conventional, such as those involved in handling a typical purchase transaction. Other aspects of operations of the transaction processing block 904, including particularly operations related to load transactions, are described further below.

Block 906 in FIG. 9 represents exception handling capabilities of the POI device. The exception handling block 906 is coupled to the card interface 902 and to the transaction processing block 904. The exception handling block 906 operates to provide suitable responses when a transaction or sequence of communications with the cash card 202 does not go as expected. Examples of situations that call for exception handling may include presentation of a cash card that has expired, or an unexpected interruption of the communications with the cash card 202.

Block 908 in FIG. 9 represents the aspects of the POI device that manage interaction with peripheral devices (e.g., user interface devices), such as a keyboard, a display screen (and/or touch screen), a speaker, a printer, a PIN (personal identification number) entry pad, a barcode reader, and/or an electronic cash register (ECR). (Collectively, these peripheral devices are indicated by block 910 in FIG. 9.) In general, the peripheral device interface 908 may operate in accordance with conventional principles.

At least some of the functional blocks shown in FIG. 9 may be implemented by a processor (not separately shown in FIG. 9) in communication with a memory (not separately shown in FIG. 9) and operating under the control of software and/or firmware instructions stored in the memory.

The POI device may also be referred to as a "load device" and may be embodied as a POS terminal, an ATM, an AVM, or a kiosk, or any other device configured to interact with a physically-present cash card.

In software terms, a payment application kernel in the POI device may interact with a terminal application manager in the POI device via an abstraction layer. The terminal application manager may drive the user interface of the POI device and manage payment kernel processing and send instructions to one or more payment kernels in the POI device. The payment kernel(s) may interface to the cash card. The payment kernel(s) may, for example, operate in accordance with the EMV standard, apart from functionality described herein to implement the pre-authorized and cleared payment loads.

In some embodiments, the POI device may include hardware and/or software features that render the POI device tamper-proof and that cause the encryption keys to be destroyed if tampering is attempted. These features are not separately indicated in the drawing and may be implemented in accordance with conventional practices.

Figure 9A:
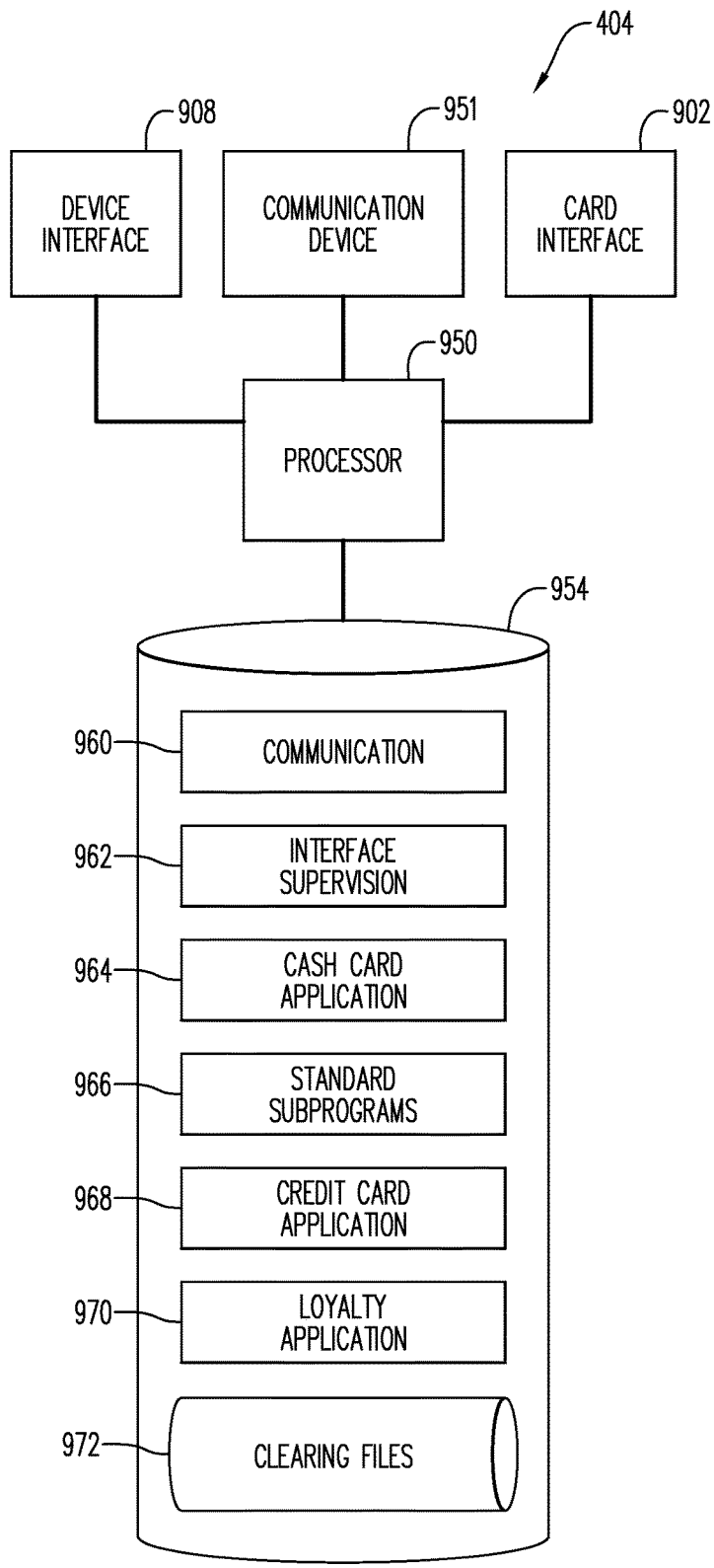
FIG. 9A is an alternative block diagram representation of a POS terminal that is included in the system of FIG. 1.

FIG. 9A is an alternative block diagram representation of a POS terminal 404, which terminal may in general also be provided in accordance with FIG. 9 and the above description of FIG. 9.

The POS terminal 404 may be conventional in its hardware aspects but may be controlled by software to cause it to function as described herein.

The POS terminal 404 may include a computer processor 950, operatively coupled to the above-mentioned card interface 902 and device interface 908, as well as to a communication device 951 and a storage device 954. The processor 950 may be constituted by one or more conventional processors. Processor 950 operates to execute processor-executable steps contained in program instructions described below, so as to control the POS terminal 404 to provide desired functionality.

Communication device 951 may be used to facilitate communication with, for example, other devices, such as a merchant data processing system or a computer operated by or on behalf of the acquirer 210.

Storage device 954 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 954 stores one or more software and/or firmware programs for controlling the processor 950. The programs comprise program instructions (which may be referred to as computer readable program code means) that contain processor-executable process steps of the POS terminal 404, executed by the processor 950 to cause the POS terminal 404 to function as described herein.

The programs may include a communication application 960 that controls the processor 950 to enable the POS terminal 404 to engage in data communication with other devices in a conventional manner. The programs may also include one or more drivers 962 or similar programs to enable the processor 950 to receive data from and/or transmit data to peripheral devices and/or one or more card readers via the device interface 908 and the card interface 902.

The programs stored in the storage device 954 may also include a cash card application program 964 that controls the POS terminal 404 to perform cash card purchase transactions and/or load transactions, as described herein. Associated with the cash card application program 964 and also stored on the storage device 954 are one or more kernels or subprograms 966, as will be described further in connection with FIG. 9B.

In some embodiments, the storage device 954 also stores a conventional (or largely conventional) credit card application program 968 that controls the POS terminal 404 to perform purchase transactions with credit cards presented to the POS terminal 404. In addition, the storage device 954 stores a conventional loyalty program application 970 that captures and stores purchase transactions (including payment card transactions and other transactions) to be credited to customer's loyalty program accounts.

Block 972 in FIG. 9A represents a database of transaction clearing files to be uploaded from the POS terminal 404 to the acquirer for clearing by card issuers.

The storage device 954 may also store other programs and other data besides that explicitly mentioned above.

Figure 9B:
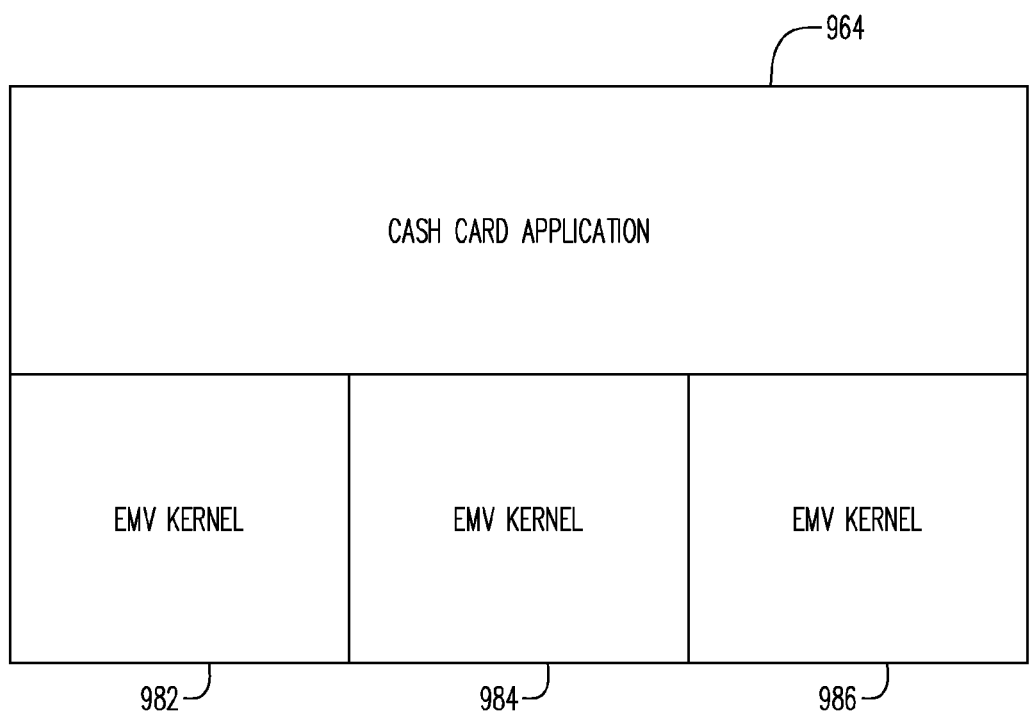
FIG. 9B schematically illustrates aspects of software/firmware that may be stored in and control operation of the POS terminal of FIG. 9A.

FIG. 9B schematically illustrates aspects of software/firmware that may be stored in and control operation of the POS terminal.

As in FIG. 9A, reference numeral 964 represents a cash card application that controls the POS terminal 404 to perform cash card purchase transactions and/or load transactions, as described herein. Associated with and supervised by the cash card application 964 are kernels or subprograms 982, 984 and 986. As used in this disclosure and in the appended claims the term "kernel" or "subprogram" refers to a program or program module that has been certified for operation in accordance with a standard protocol for payment card transactions. In accordance with aspects of the present invention, the kernels 982, 984 and 986 are all certified for operation with the above-mentioned EMV standard.

In one embodiment, the kernel 982 is configured to handle off-line purchase transactions in which no cardholder verification method (CVM) is required to be performed; the kernel 984 is configured to handle online load transactions in which the required CVM is entry of a PIN and verification of the PIN by a remote computer (such as the cash card system host computer 208); the kernel 986 is configured to handle online load transactions in which no CVM is required.

Figure 10:
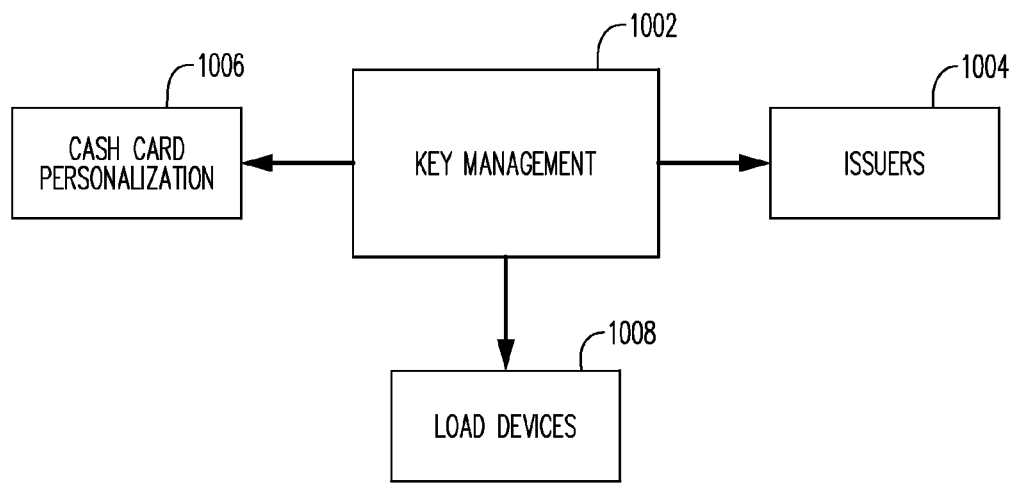
FIG. 10 is a functional block diagram that schematically illustrates management of data encryption keys in the system of FIG. 1 in accordance with aspects of the present invention.

FIG. 10 is a functional block diagram that schematically illustrates management of data encryption keys in the payment card system 100.

In FIG. 10, block 1002 represents a central encryption key management authority, which may for example be the sponsor (e.g., a payment card association such as the assignee hereof) of the cash card system. The central encryption key management authority 1002 may have overall control of the encryption keys utilized in connection with loading of cash cards and/or other operations related to cash cards. In accordance with conventional practices, each issuer (block 1004) may be provided with an issuer master encryption key. ICC (integrated circuit card) master keys may be derived from the issuer master key and stored securely via a personalization process (block 1006) on the cash cards. During online load operations, the issuer builds a secure message using a session key derived from the relevant ICC master key. When the cash card receives the message, the cash card derives the same session key, in order to authenticate the message and execute a script to reload the cash card. In some embodiments, at least some of the issuer functions related to on-line load transactions may be performed by the cash card system host computer 208 on an "on behalf" basis for the actual issuer of the cash card.

To facilitate off-line load/card activation transactions, and in accordance with aspects of the present invention, a common second set of ICC master keys may be stored on every cash card and on every load device (or at least on every load device that performs off-line load transactions). (The load devices are represented at block 1008 in FIG. 10.) When this second master key is used, it is referenced via a key derivation index passed from the cash card that is being loaded to the load device. The key derivation index can point to a number of keys. The load device builds a secure message using a session key derived from the off-line master key as referenced by the key derivation index. The secure message includes a script to be executed by the cash card, and the secure message is transmitted to the cash card from the load device. The cash card authenticates the session key and executes the script to accomplish the desired load transaction.

In both on-line and off-line loads, the session key may be derived from the master key (either on-line or off-line) using, for example, the cash card PAN (primary account number), the PAN sequence number and a random number or any partial combination thereof and other elements as necessary.

To reduce any risk of attempts to compromise the off-line load process, the off-line master keys may be stored securely in the load devices in hardware security modules and derived keys. For example, the load devices may be made tamper-resistant. The type of encryption used may be strong, such as double length DES (Data Encryption Standard) encryption.

Even if a wrongdoer were able to work out the off-line master key, the wrongdoer would still have to build his/her own counterfeit load device and attempt to use it to perform loads on cash cards. There may be features in the system that would mitigate any risks of this type of attack. For example, the cash card system is "closed loop" in the sense that all loads and purchase transactions are accounted for. Spurious loads would quickly be detected during reconciliation of card account records. This process would reveal the numbers (PANs) of any cards that were spuriously loaded.

Further, the comprised off-line master key could be disabled and the key derivation index changed. The compromised key would no longer work for load operations, and legitimate cards would continue to work.

Other risk mitigation measures that may be undertaken may include blocking compromised cards via a blacklist process, limiting load amounts per day per card to US$300 or another suitable amount, and limiting use of cash cards to the country in which they are issued.

Figure 11:
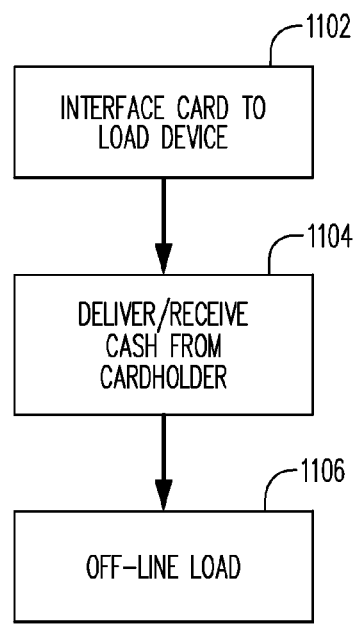
FIG. 11 is a flow chart that illustrates an off-line load process that may be performed in the system of FIG. 1 in accordance with aspects of the present invention.

FIG. 11 is a flow chart that illustrates an off-line load process that may be performed in the payment card system 100 in accordance with aspects of the present invention.

At 1102 in FIG. 11 (and referring also to FIG. 2), the cardholder 200 interfaces the cash card 202 to the load device 204. As noted above this may be done via the contacts 808 (FIG. 8) on the cash card 202 and via the card interface 902 (FIG. 9) of the load device 204. It should also be noted that instead of the cardholder interfacing the cash card 202 to the load device 204, this action may be performed by an employee (not shown) of a merchant, bank or service provider. (In some embodiments, the cash card 202 may be interfaced to the load device 204 on a contactless basis.)

At 1104 in FIG. 11, the cardholder 202 delivers and the merchant/bank/service provider employee receives cash to cover the requested amount of the desired load transaction. (It will be evident that step 1104 may be performed prior to step 1102.)

Figure 12:
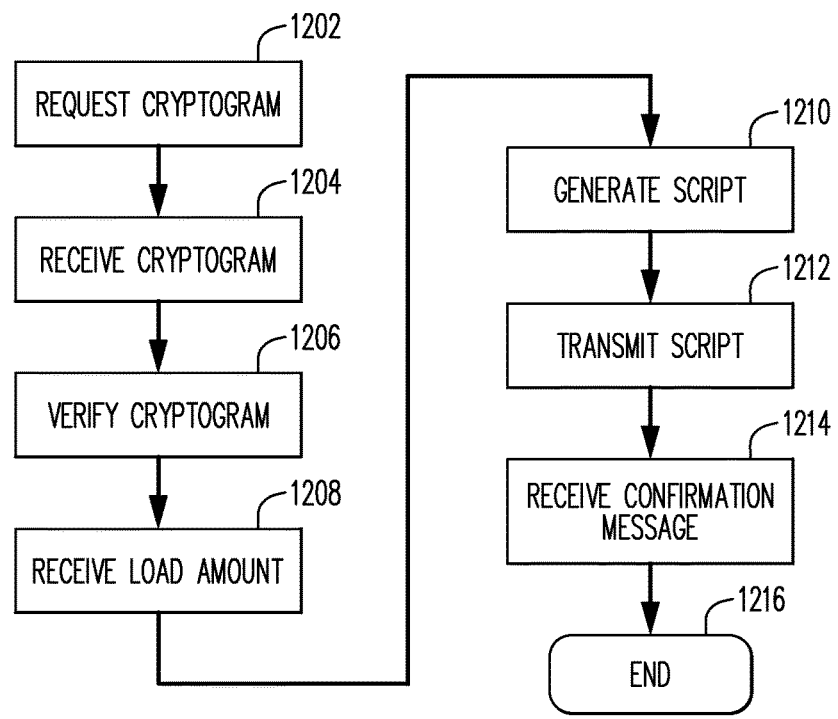
FIG. 12 is a flow chart that illustrates some details of the process of FIG. 11.

Next, at 1106, an off-line load transaction is performed, as described in more detail below in conjunction with FIG. 12. (FIG. 12 is a flow chart that illustrates some details of step 1106.) It should be understood that the process of FIG. 12 may be initiated by the employee providing suitable input to the load device 204, such as selecting an "off-line load" option from a menu (not shown).

At 1202 in FIG. 12, the load device 204 sends a message to the cash card 202, requesting that the cash card 202 provide a cryptogram to the load device 204 to verify the authenticity of the cash card 202. At 1204, the load device 204 receives the cryptogram from the cash card 202. At 1206, the load device 204 verifies the cryptogram.

The generation and verification of the cryptogram may be performed in accordance with conventional security practices employed in connection with "topping-up" pre-authorized payment cards. In verifying the cryptogram, the load device 204 may perform a cryptographic calculation to produce a result that is supposed to match the cryptogram received from the cash card 202. If the result of the cryptographic calculation by the load device matches the cryptogram received from the cash card 202, then the cryptogram is considered to have been verified. It will be understood that the same cryptographic calculation process had been performed by the cash card 202 to generate the cryptogram. (For the purposes of this example, it will be assumed that the cryptogram is verified. If such is not the case, the process may proceed, by a branch not shown in the drawing, to a suitable exception handling process, and the load transaction is aborted.) The receipt and verification of the cryptogram produced by the cash card 202 may be considered a technique for authenticating the cash card 202.

At 1208 in FIG. 12 (i.e., following verification of the cryptogram), the load device 204 receives input from the operator (i.e., the employee of the merchant/bank/service provider) to indicate the amount of pre-authorized funds to be loaded into the cash card 202. Presumably, this amount reflects the amount of cash tendered by the cardholder. (In other embodiments, input of the amount to be loaded may occur prior to or overlapping in time with the steps illustrated at 1202-1206.)

Next in the process is step 1210. At 1210, the load device 204 generates a script that is to be executed by the cash card 202 to implement the desired load of pre-authorized funds into the cash card 202. In some embodiments, the load device 204 may generate the script in a manner similar to generation of top-up scripts in accordance with the "M/Chip" standard (or alternatively the "M/Chip Advanced" standard) promulgated by the assignee hereof and/or in accordance with the above-mentioned EMV standard. The load device 204 may encrypt the script using the above-mentioned off-line master encryption key. More specifically, the load device 204 may use a derived indexed load key associated with a payment application program that runs in the load device. The derived load key is used to generate a dynamic session key used in secure messaging with a payment application that runs in the cash card 202.

Step 1212 follows step 1210. At step 1212, the load device 204 transmits the encrypted script to the cash card 202. Thereafter, at 1214, the load device 204 receives a message from the cash card 202 to confirm that the cash card 202 has executed the script, thereby accomplishing the desired load of pre-authorized funds into the cash card 202. The process then ends, as indicated at 1216. (If the confirmation message is not received within a certain amount of time, then an exception handling process—which is not represented in the drawing—may be initiated.)

It will be understood that before providing the confirmation message, the cash card 202 executes the script received from the load device 204. The execution of the script may be similar to execution of a top-up script as called for by the above-mentioned M/Chip standard and/or the EMV standard. Upon execution of the script, the pre-authorized amount stored in the cash card 202 is increased by the amount of the load transaction, thereby increasing the balance available for purchase transactions with the cash card 202.

Subsequent to the off-line load transaction, and possibly in an end of day batch operation, notification of the off-line load transaction is provided (e.g., from the load device 204 via the acquirer 210—FIG. 2) to the cash card system host computer 208. The cash card system host computer 208 then updates the account record for the cash card 202 to reflect the off-line load transaction. A later clearing transaction results in a transfer of the funds collected by the merchant to the card issuer. In addition or alternatively, the clearing transaction itself provides the notification of the off-line load transaction to the cash card system host computer 208.

Figure 13:
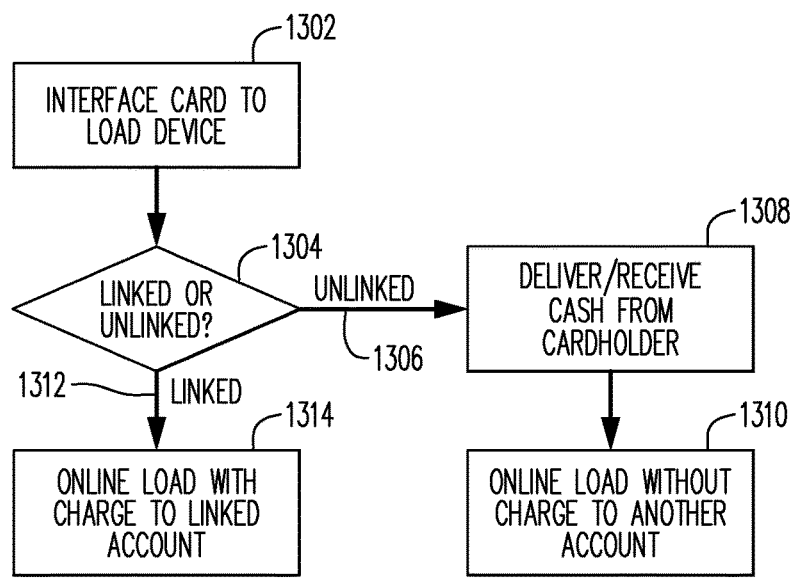
FIG. 13 is a flow chart that illustrates an on-line load process that may be performed in the system of FIG. 1 in accordance with aspects of the present invention.

FIG. 13 is a flow chart that illustrates an on-line load process that may be performed in the payment card system 100 in accordance with aspects of the present invention.

At 1302 in FIG. 13 (and referring also to FIG. 3), the cardholder 200 interfaces the cash card 202 to the load device 204. As noted above this may be done via the contacts 808 (FIG. 8) on the cash card 202 and via the card interface 902 (FIG. 9) of the load device 204 (or alternatively, the cash card 202 may be interfaced to the load device 204 on a contactless basis). It should also be noted that instead of the cardholder interfacing the cash card 202 to the load device 204, this action may be performed by an employee (not shown) of a merchant, bank or service provider.

Following block 1302 is a decision block 1304. At decision block 1304, it is determined whether or not the on-line load is to be based on a link between the cash card 202 and another account (e.g., a credit or debit card account) that belongs to the cardholder 200. That is, it is determined at decision block 1304 whether the current load transaction is to be funded from a linked account, or is to be funded with cash tendered by the cardholder 200. This determination may be made based on input provided to the load device 204 by the operator (merchant/bank/service provider employee), and may reflect a dialogue between the operator and the cardholder in which the cardholder indicates whether he/she desires linked or cash funding for the on-line load transaction. As part of decision block 1304, if the cardholder requests a linked on-line load transaction, the load device 204 may receive a "link status indication" from the cash card 202. The link status indication is a data element stored in the cash card 202 which indicates whether the cash card 202 is linked to another account. It may be the case that the on-line load transaction will be allowed to proceed on a linked basis only if the link status indication indicates that the cash card 202 is linked to another account.

However, in other embodiments, the determination made at decision block 1304 is made entirely on the basis of the link status indication. That is, if the link status indication indicates that the cash card 202 is linked to another account, then the on-line load transaction automatically proceeds on a linked basis. If the link status indication indicates that the cash card 202 is not linked to another account, then a cash tender from the cardholder is required, and the load transaction must occur on an unlinked basis.

If it is determined at decision block 1304 that the on-line load transaction is not to be via funding from a linked account, then the process of FIG. 13 advances via branch 1306 from decision block 1304 to block 1308.

At 1308 in FIG. 13, the cardholder 200 delivers and the merchant/bank/service provider employee receives cash to cover the requested amount of the desired on-line load transaction. (It will be evident that step 1308 may be performed prior to or as part of decision block 1304.)

Figure 14:
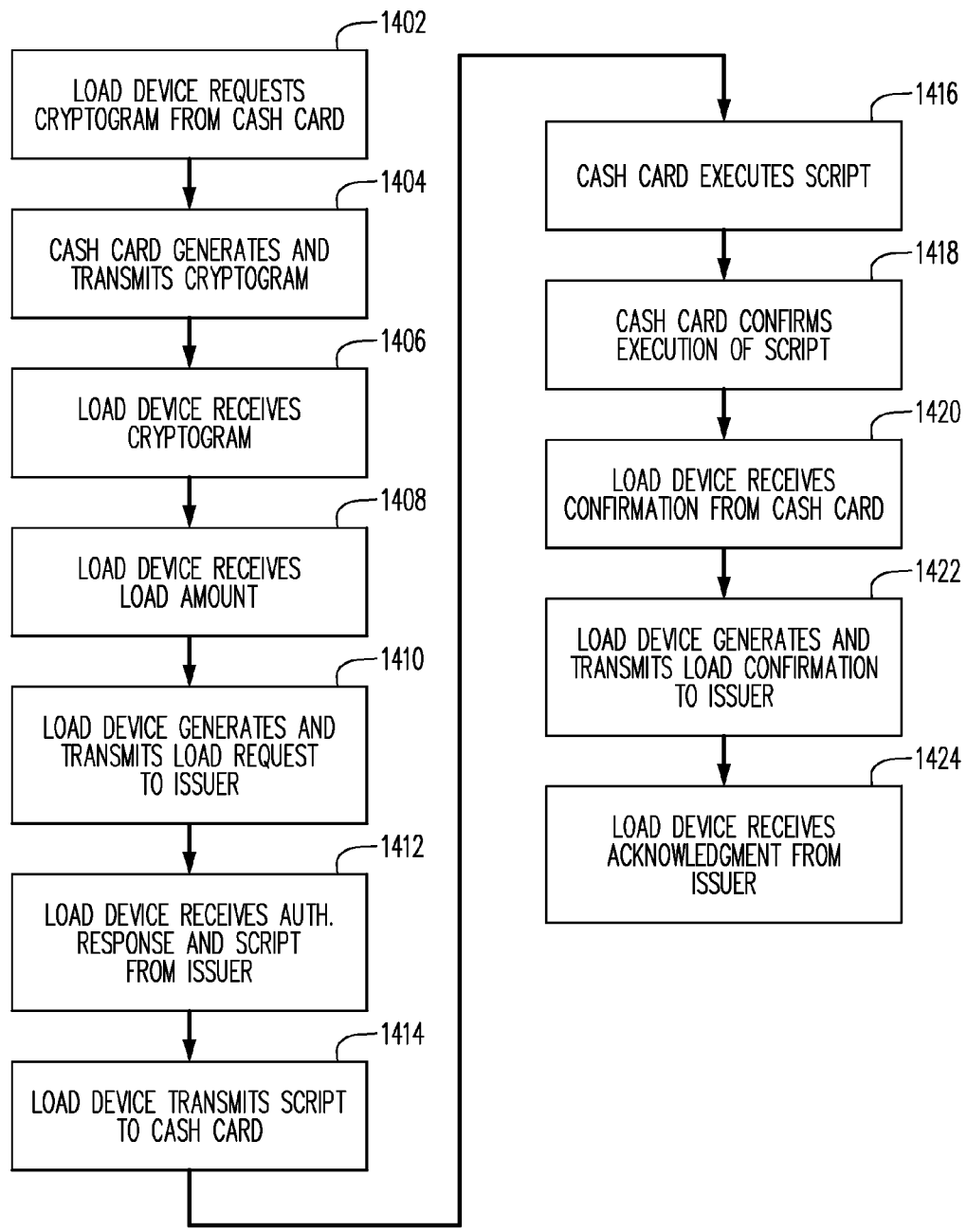
FIG. 14 is a flow chart that illustrates some details of the process of FIG. 13.

Following block 1308, is block 1310. At block 1310, an on-line load transaction takes place, without a further funding transaction from a linked account. FIG. 14, which is discussed below, provides details of the unlinked on-line load transaction from the point of view of the load device 204 and the cash card 202; and FIG. 15, which is also discussed below, provides details of the unlinked on-line load transaction from the point of view of the cash card system host computer 208.

If it is determined at decision block 1304 that the on-line load transaction is to be via funding from a linked account, then the process of FIG. 13 advances via branch 1312 from decision block 1304 to block 1314.

Figure 15:
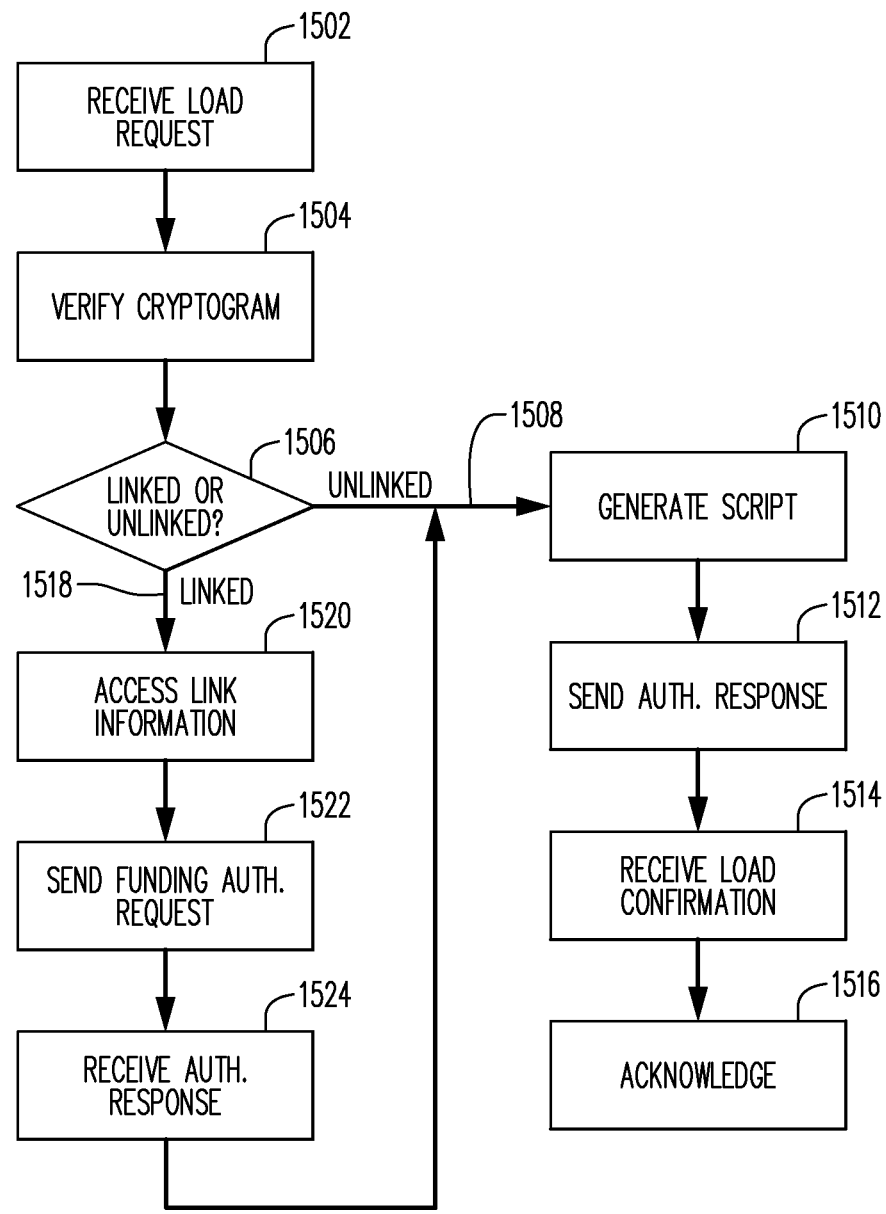
FIG. 15 is a flow chart that illustrates aspects of the on-line load process as performed by the cash card system host computer in accordance with aspects of the present invention.

At block 1314, an on-line load transaction takes place, in conjunction with a further funding transaction from the linked account. FIGS. 14 and 15 provide details of the linked load transaction, from the points of view of the load device 204 and the cash card system host computer 208, respectively.

FIG. 14 is a flow chart that illustrates some details of the process of FIG. 13. In particular, FIG. 14 illustrates operations performed by the load device 204 and the cash card 202 and illuminates aspects of blocks 1310 and 1314 in FIG. 13.

At 1402 in FIG. 14, the load device 204 requests the cash card 202 to provide a cryptogram to authenticate the cash card 202 for the desired on-line load transaction. At 1404, the cash card 202 generates the requested cryptogram and transmits it to the load device 204. At 1406, the load device 204 receives the cryptogram from the cash card 202. (Reference is made to the above discussion of steps 1202-1206—FIG. 12. That discussion is pertinent to steps 1402-1406 and provides additional detail as to the manner in which steps 1402-1406 may be performed.)

At 1408 in FIG. 14, the load device 204 receives input from the operator (i.e., the employee of the merchant/bank/service provider) to indicate the amount of pre-authorized funds to be loaded into the cash card 202. Presumably, this amount reflects an amount communicated orally from the cardholder to the operator of the load device 204. In the case of an unlinked on-line load transaction, the amount entered by the operator would also reflect the amount of cash tendered by the cardholder. (In various embodiments, input of the amount to be loaded may occur after, prior to or overlapping in time with the steps illustrated at 1402-1406.)

At 1410 in FIG. 14, the load device 204 generates and transmits to the cash card system host computer 208 (via the acquirer 210, FIG. 3) a request message in which the load device 204 requests the desired on-line load transaction. The request message may indicate the PAN for the cash card 202, the amount of pre-authorized funds to be loaded into the cash card 202, and an indication as to whether or not the requested on-line load transaction is to be funded from a linked account. The request message in this case may be in the nature of an authorization request message, which may also be referred to as an "authorization message". As will be seen, with the authorization message, the load device 204 is effectively requesting from the cash card system host computer 208 a script to be executed by the cash card 202. The authorization message may also include the cryptogram generated by the cash card 202 and transmitted to the load device 204.

Thereafter, at 1412, the load device 204 receives an authorization response from the cash card system host computer 208. Assuming that the cash card system host computer 208 found everything to be in order with the request message, the authorization response includes a script to be executed by the cash card 202 to accomplish the desired load transaction. The script may be similar to the script as referred to in connection with step 1210 above, except that in the case of the script received at step 1412, the script may have been generated by the cash card system host computer 208 and encrypted by the cash card system host computer 208 with the on-line load transaction master key.

At 1414 the load device 204 transmits the script received at step 1412 to the cash card 202. At 1416 the cash card 202 executes the script so as to increase the amount of pre-authorized funds stored in the cash card 202. At 1418 the cash card 202 sends to the load device 204 a confirmation that the cash card 202 has executed the script, resulting in the desired load of pre-authorized funds into the cash card 202. At 1420, the load device 204 receives the confirmation from the cash card 202.

At 1422, the load device 204 generates and transmits to the cash card system host computer 208 another message, also in the form of an authorization message. However, in this case the authorization message is simply for the purpose of confirming to the cash card system host computer 208 that the desired load transaction has been performed successfully. Then, at 1424 the load device 204 receives from the cash card system host computer 208 an acknowledgement of the authorization (confirmation) message transmitted by the load device 204 at step 1422.

It will be appreciated that in a case where the on-line load transaction is not on a "linked" basis (i.e., where the load transaction is not funded from an account linked to the cash card 202), a subsequent clearing operation will transfer to the card issuer the funds collected by the merchant from the cardholder.

It should also be noted that the communications described above between the load device 204 and the cash card system host computer 208 may all occur via the acquirer 210 (FIG. 3) and via a payment card system network (not shown in FIG. 3) such as the Banknet network operated by the assignee hereof.

In some embodiments, every linked and/or unlinked load transaction for a given cash card is in a set amount that is pre-arranged between the cardholder and the card issuer. In such embodiments, step 1408 may be omitted from the process of FIG. 14 for on-line load transactions performed funded on a linked basis. The amount of the load transaction may be indicated by data stored in the cash card and read by the POI terminal. It may also be the case that a linked load transaction requires compliance with a cardholder verification method (CVM) such as entry of a PIN (personal identification number) by the cardholder and verification of the PIN.

FIG. 15 is a flow chart that illustrates aspects of the on-line load process as performed by the cash card system host computer 208 in accordance with aspects of the present invention. That is, FIG. 15 illustrates aspects of steps 1310 and 1314 of FIG. 13.

At 1502 in FIG. 15, the cash card system host computer 208 (acting in a role on behalf of the card issuer, and thus performing an issuer function and acting in an issuer mode) receives the authorization message (on-line load transaction request) that the load device 204 transmitted to the cash card system host computer 208 via acquirer 210 (FIG. 3) at step 1410 (FIG. 14). Continuing to refer to FIG. 15, at 1504 the cash card system host computer 208 verifies the cryptogram that the cash card 202 generated at step 1404 and that was included in the on-line load transaction request received by the cash card system host computer 208 at 1502. The verification of the cryptogram at 1504 by the cash card system host computer 208 may be performed in the same manner or in a manner similar to the cryptogram verification performed by the load device 204 (step 1206, FIG. 12) in the case of an off-line load transaction. At about the same time that the cash card system host computer 208 verifies the cryptogram, it may also verify that there is a valid record in the account management system for the cash card PAN included in the authorization message.

At decision block 1506 in FIG. 15, the cash card system host computer 208 determines whether the on-line load transaction has been requested on a linked or unlinked basis. The cash card system host computer 208 may make this determination based on an indication included in the on-line load transaction request received at 1502.

In the case where the requested on-line load transaction is unlinked, then the process of FIG. 15 advances via branch 1508 from decision block 1506 to block 1510. At block 1510 the cash card system host computer 208 generates the script that was referred to above in connection with steps 1412-1416 in FIG. 14. The cash card system host computer 208 may encrypt the script with the on-line load transaction master encryption key that was referred to above in connection with FIG. 10.

At 1512, the cash card system host computer 208 sends to the load device 204 (via the payment card system network and the acquirer) an authorization response that includes the script generated and encrypted by the cash card system host computer 208 at 1510. At 1514, the cash card system host computer 208 receives from the load device 204 the authorization (confirmation) message referred to at step 1422 in FIG. 14. As noted above, the latter authorization message confirms to the cash card system host computer 208 that the requested on-line load transaction has been performed successfully. At 1516 in FIG. 15, the cash card system host computer 208 sends to the load device 204 an acknowledgement of the second authorization message (as mentioned above in connection with step 1424, FIG. 14).

It will be noted that the cash card system host computer 208 is operated in what is essentially an issuer mode (on behalf of the card issuer) in performing steps 1510-1516.

Referring again to decision block 1506, if the cash card system host computer 208 determines that the on-line load transaction has been requested on a linked basis, then the process of FIG. 15 advances via branch 1518 from decision block 1506 to block 1520.

At block 1520, the cash card system host computer 208 accesses information that indicates a credit or debit card account or other account that is linked to the cash card 202. The cash card system host computer 208 may access this information by using the PAN for the cash card 202. At 1522, and acting in an acquirer mode, the cash card system host computer 208 sends an authorization request to the issuer (reference numeral 304, FIG. 3) of the cash card 202 to request a transaction in which the linked account is charged to fund the requested on-line load transaction. This authorization request (step 1522) may be sent from the cash card system host computer 208 to the card issuer 304 via the above-mentioned payment card system network.

At 1524 the cash card system host computer 208 (continuing to act in an acquirer mode) receives an authorization response from the card issuer. Assuming that all was in order with the requested linked funding transaction, as indicated by the authorization response received at 1524, then the process continues with the above-described steps 1510-1516 by which the cash card system host computer 208 causes the requested on-line load transaction to be accomplished.

For any given cash card 202, the card may be loaded on a number of occasions via an off-line load transaction as described above, and on a number of other occasions may be loaded via an on-line (linked or unlinked) load transaction, as described above. On different occasions a given cash card may be loaded using different load devices among the numerous load devices that may be included in the payment card system 100.

Figure 16:
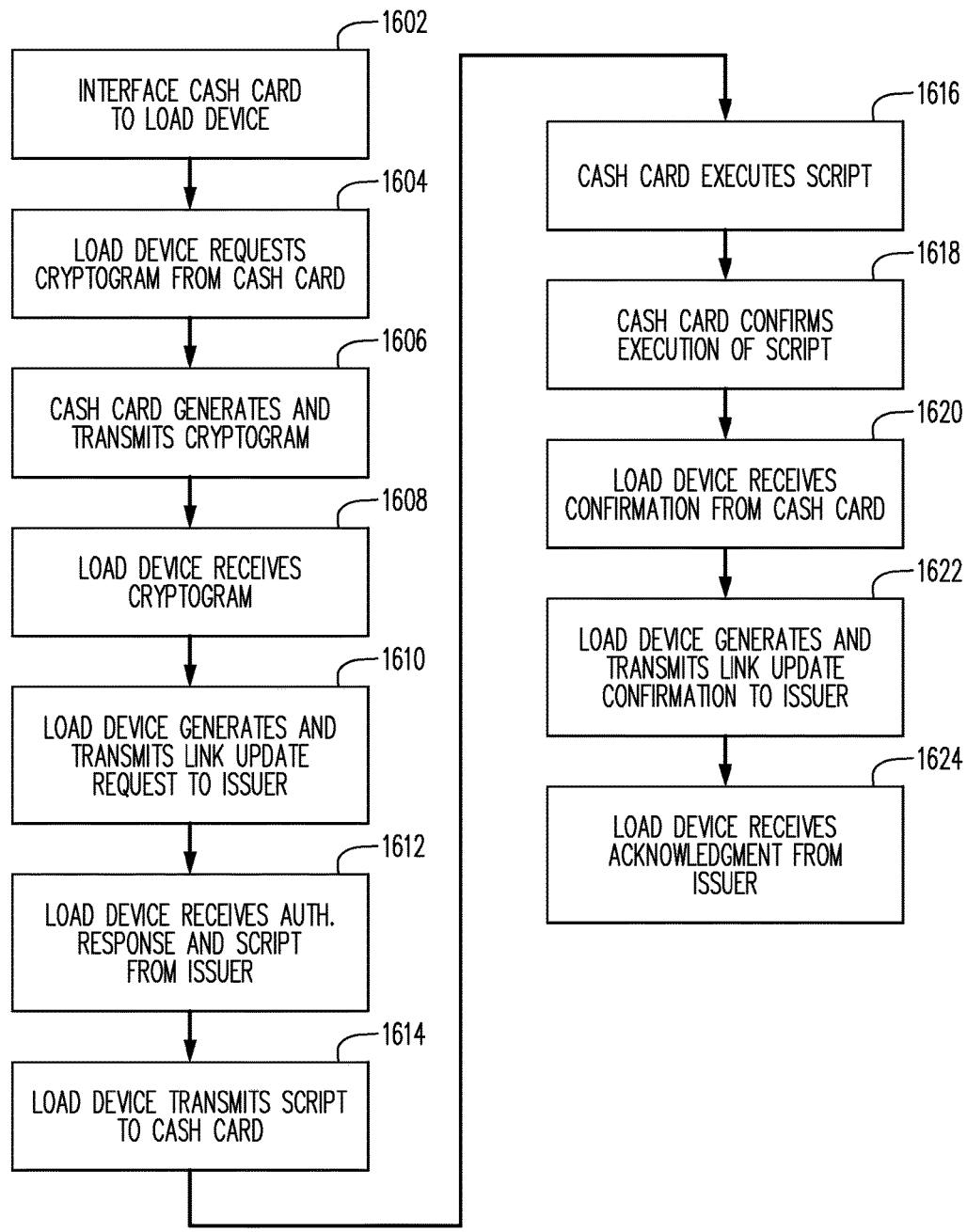
FIG. 16 is a flow chart that illustrates a link update process that may be performed in the system of FIG. 1 in accordance with aspects of the present invention.

FIG. 16 is a flow chart that illustrates a link update process that may be performed in the payment card system 100 in accordance with aspects of the present invention. The purpose of the link update process is to change/update the link status indicator that is stored in the cash card 202, as referred to above in connection with block 1304 (FIG. 13). The link status indicator may need to be updated, for example, if the cash card 202 has not previously been linked to another account, but the cardholder desires that such a link be made, and the cardholder makes arrangements accordingly with the card issuer. Conversely, updating of the link status indicator stored in the cash card 202 may also be necessary when the cardholder desires to sever an existing link between the cash card 202 and another account (e.g., if the cardholder is closing the linked account). Typically, for example, the cardholder may visit a branch location of the card issuer and meet with an employee of the card issuer to arrange for the link between the cash card 202 and an account owned by the cardholder (perhaps this occurs upon the occasion of the opening of the account with which the link is to be made). As part of the interaction between the cardholder and the bank employee, the bank employee updates the records at the cash card system host computer 208 and the card issuer's own records, and the bank employee also operates a load device 204 or similar device at the branch location to perform the process illustrated in FIG. 16. (Alternatively, the cardholder may be directed to a merchant or service provider location at which the process of FIG. 16 may be performed.)

Turning then to FIG. 16, at 1602 the bank employee interfaces the cash card 202 to the load device 204. This may be done via the contacts 808 (FIG. 8) on the cash card 202 and via the card interface 902 (FIG. 9) of the load device 204 (or alternatively, the cash card 202 may be interfaced to the load device 204 on a contactless basis).

At 1604, the load device 204 requests the cash card 202 to provide a cryptogram to authenticate the cash card 202 for the desired link status indicator update transaction. At 1606, the cash card 202 generates the requested cryptogram and transmits it to the load device 204. At 1608, the load device 204 receives the cryptogram from the cash card 202. (Reference is made to the above discussion of steps 1202-1206—FIG. 12. That discussion is pertinent to steps 1604-1608 and provides additional detail as to the manner in which steps 1604-1608 may be performed.)

At 1610, the load device 204 generates a request to update the link status indicator stored in the cash card 202. This may occur, for example, in response to the bank employee selecting a suitable menu option by interacting with the user interface of the load device 204. Also as part of step 1610, the load device 204 transmits the link status update request to the cash card system host computer 208.

At 1612, the load device 204 receives an authorization response from the cash card system host computer 208. Assuming that the cash card system host computer 208 found everything to be in order with the request message (and with the records of the cash card system host computer 208 relative to the cash card account), the authorization response includes a script to be executed by the cash card 202 to accomplish the desired link status indicator update. The script may have been generated by the cash card system host computer 208 and encrypted by the cash card system host computer 208 with the on-line load transaction master key.

At 1614, the load device 204 transmits the script received at step 1612 to the cash card 202. At 1616 the cash card 202 executes the script so as to change/update the link status indicator stored in the cash card 202. At 1618 the cash card 202 sends to the load device 204 a confirmation that the cash card 202 has executed the script, resulting in the desired updating of the link status update stored in the cash card 202. At 1620, the load device 204 receives the confirmation from the cash card 202.

At 1622, the load device 204 generates and transmits to the cash card system host computer 208 another message, also in the form of an authorization message. However, in this case the authorization message is simply for the purpose of confirming to the cash card system host computer 208 that the desired link status indicator update has been performed successfully. Then, at 1624 the load device 204 receives from the cash card system host computer 208 an acknowledgement of the authorization (confirmation) message transmitted by the load device 204 at step 1622.

Figure 17:
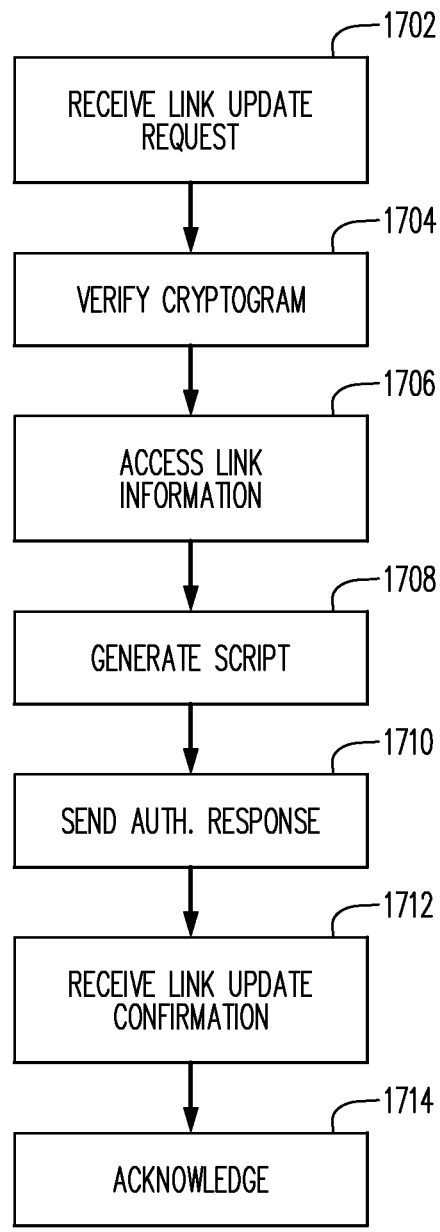
FIG. 17 is a flow chart that illustrates aspects of the link update process as performed by the cash card system host computer in accordance with aspects of the present invention.

FIG. 17 is a flow chart that illustrates aspects of the link update process as performed by the cash card system host computer 208 in accordance with aspects of the present invention.

At 1702 in FIG. 17, the cash card system host computer 208 receives the authorization message (link status indicator update request) that the load device 204 transmitted to the cash card system host computer 208 at step 1610 (FIG. 16). Continuing to refer to FIG. 17, at 1704 the cash card system host computer 208 verifies the cryptogram that the cash card 202 generated at step 1604 and that was included in the link status indicator update request received by the cash card system host computer 208 at 1702. The verification of the cryptogram at 1704 by the cash card system host computer 208 may be performed in the same manner or in a manner similar to the cryptogram verification performed by the cash card system host computer 208 (step 1504, FIG. 15) in the case of an on-line load transaction.

At 1706, the cash card system host computer 208 accesses information in its records relative to the cash card 202 and any link or absence of a link between the cash card 202 and another account owned by the cardholder. Assuming that the information accessed by the cash card system host computer 208 at 1706 is consistent with the requested link status indicator update, then block 1708 follows block 1706.

At 1708, the cash card system host computer 208 generates the script that was referred to above in connection with steps 1612-1616 in FIG. 14. The cash card system host computer 208 may encrypt the script with the on-line transaction master encryption key that was referred to above in connection with FIG. 10.

At 1710, the cash card system host computer 208 sends to the load device 204 (via the payment card system network and the acquirer) an authorization response that includes the script generated and encrypted by the cash card system host computer 208 at 1708. At 1712, the cash card system host computer 208 receives from the load device 204 the authorization (confirmation) message referred to at step 1622 in FIG. 16. As noted above, the latter authorization message confirms to the cash card system host computer 208 that the requested link status indicator update has been performed successfully. At 1714 in FIG. 17, the cash card system host computer 208 sends to the load device 204 an acknowledgement of the second authorization message (as mentioned above in connection with step 1624, FIG. 16).

It should be understood that the communication between the load device 204 and the cash card system host computer 208 in connection with the processes of FIGS. 16 and 17 may be via the payment card system network. It will also be appreciated that there may be a computer on the card issuer side of the payment card system network acting as an intermediary between the load device 204 and the payment card system network/cash card system host computer 208.

Figure 18:
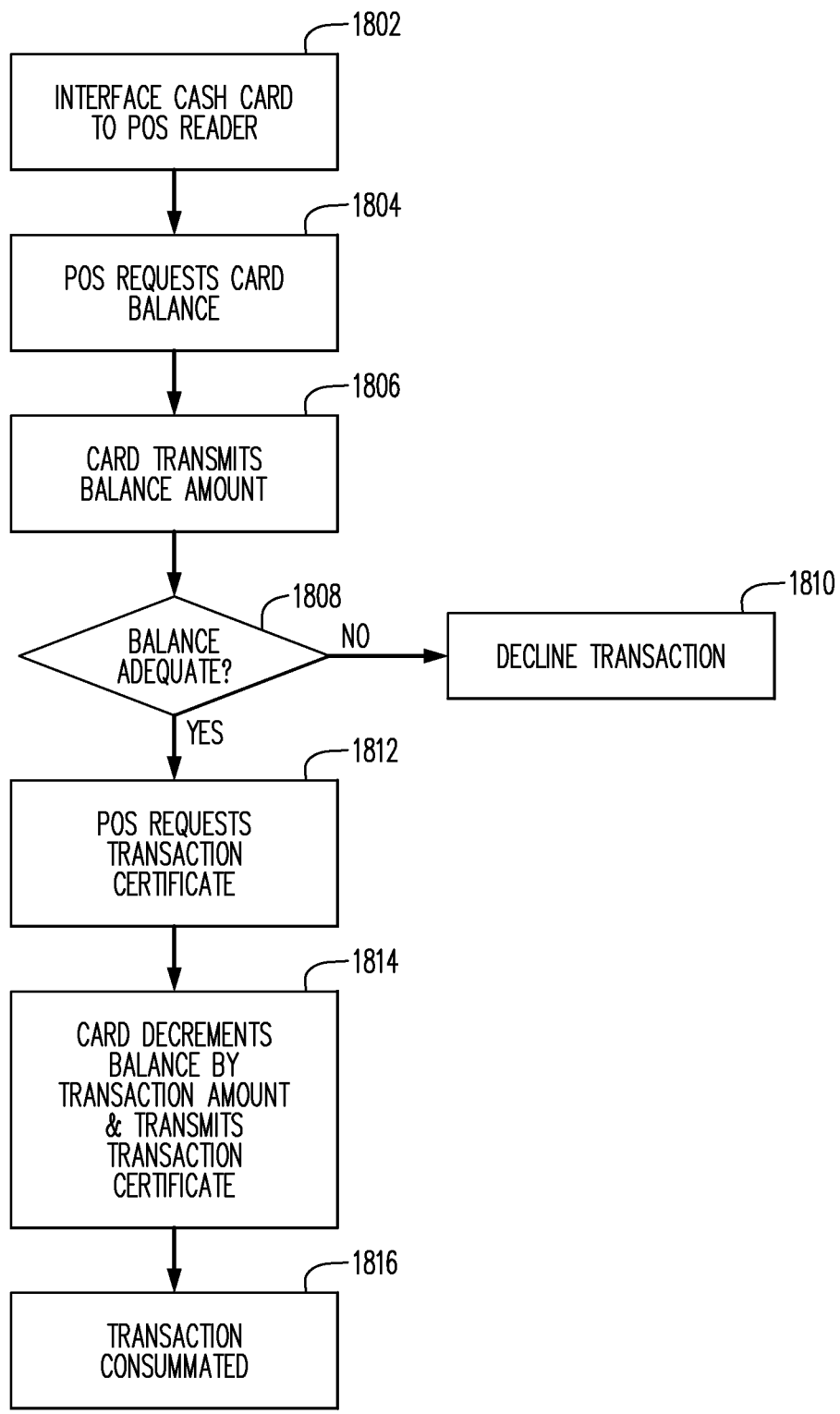
FIG. 18 is a flow chart that illustrates a process for a typical off-line purchase transaction performed in the system of FIG. 1.

FIG. 18 is a flow chart that illustrates a process for a typical off-line purchase transaction performed in the payment card system 100 using a cash card 202.

For purposes of FIG. 18, it will be assumed that the cardholder is requesting a conventional purchase transaction, such as the purchase of an item at a retail store, or an unattended purchase, such as at a vending machine, parking meter, transit access, etc. In the case of a purchase of an item or items at a retail store, it may also be assumed that one or more items are scanned at the point of sale to generate a total purchase price for the transaction to be settled by use of the cash card 202.

Referring to FIG. 4 as well as FIG. 18, at 1802 in FIG. 18 the cardholder 200 interfaces the cash card 202 to the POS terminal 404 via the POS reader 402. In a preferred, most convenient mode of performing this step, the cash card 202 interacts with the POS reader 402 by wireless RF communication, i.e., in a "contactless" manner. In one practical embodiment, this is done by the cardholder 200 simply tapping the cash card 202 at a designated point on the reader 402, in accordance with conventional practices. Even though tapping occurs, this is still considered a "contactless" or "proximity" mode of operation, because in this mode the cash card 202 is not interfaced to the reader 402 via the contacts 808 (FIG. 8) of the cash card 202.

In an alternative mode of performing this step 1802, the cash card 202 is interfaced to the POS reader 402 via the contacts 808 and via a contact interface (not separately shown in FIG. 4) of the POS reader 402.

Conventional handshaking/mutual authentication may occur upon the cash card 202 being brought into proximity of/being interfaced to the reader 402. In addition, as indicated at 1804 in FIG. 18, the POS terminal 404 may request that the cash card 202 provide its current pre-authorized balance. The cash card 202 may respond, as indicated at 1806, by transmitting its pre-authorized balance to the POS terminal 404.

At decision block 1808, the POS terminal 404 determines whether the pre-authorized balance in the cash card 202 is sufficient to cover the amount due for the purchase transaction. If not, the POS terminal 404 declines the transaction, as indicated at 1810. Alternatively, if the pre-authorized balance is sufficient, then block 1812 follows decision block 1808.

At 1812 the POS terminal 404 requests a transaction certificate from the cash card 202 to cover the amount of the transaction. This may be done in a conventional manner. Next, at 1814, the cash card 202 decrements its pre-authorized balance by the amount of the transaction and transmits the requested transaction certificate to the POS terminal 404. This too may be accomplished in accordance with conventional practices.

At this point the purchase transaction has been consummated, as indicated at 1816, and the cardholder is free to remove his/her purchase from the retail store.

(In an alternative embodiment of the process of FIG. 18, step 1804 may be omitted, and the cash card itself may decline to issue the transaction certificate, thereby aborting the transaction, in cases where the pre-authorized balance stored in the cash card is insufficient to support the transaction.)

In a subsequent (e.g., end of day batch) process, illustrated in FIG. 4 and discussed hereinabove in connection with FIG. 4, the merchant collects the amount of the purchase (less any fees) via a clearing process through the merchant's acquiring financial institution and the clearing system, with the funds cleared from the issuer of the cash card 202.

A purchase transaction using the cash card 202 may take less time, and hence be more efficient, than a similar transaction in which cash is exchanged. Purchasing with the cash card 202 may also be advantageous in other ways. For example, the cash card 202 may maintain a log of purchases (or at least of recent purchases).

In some embodiments, the cash card 202 may be used for a purchase transaction even when the pre-authorized balance is less than the amount of the transaction. This may be done by combining, for example, a linked on-line load transaction with the purchase transaction, as illustrated in FIG. 5, as discussed above. For such a combined transaction, it may in some embodiments be necessary to interface the cash card 202 to the POS reader via the contact interface. A transaction of this type will be described further below in connection with FIG. 22.

Figure 19:
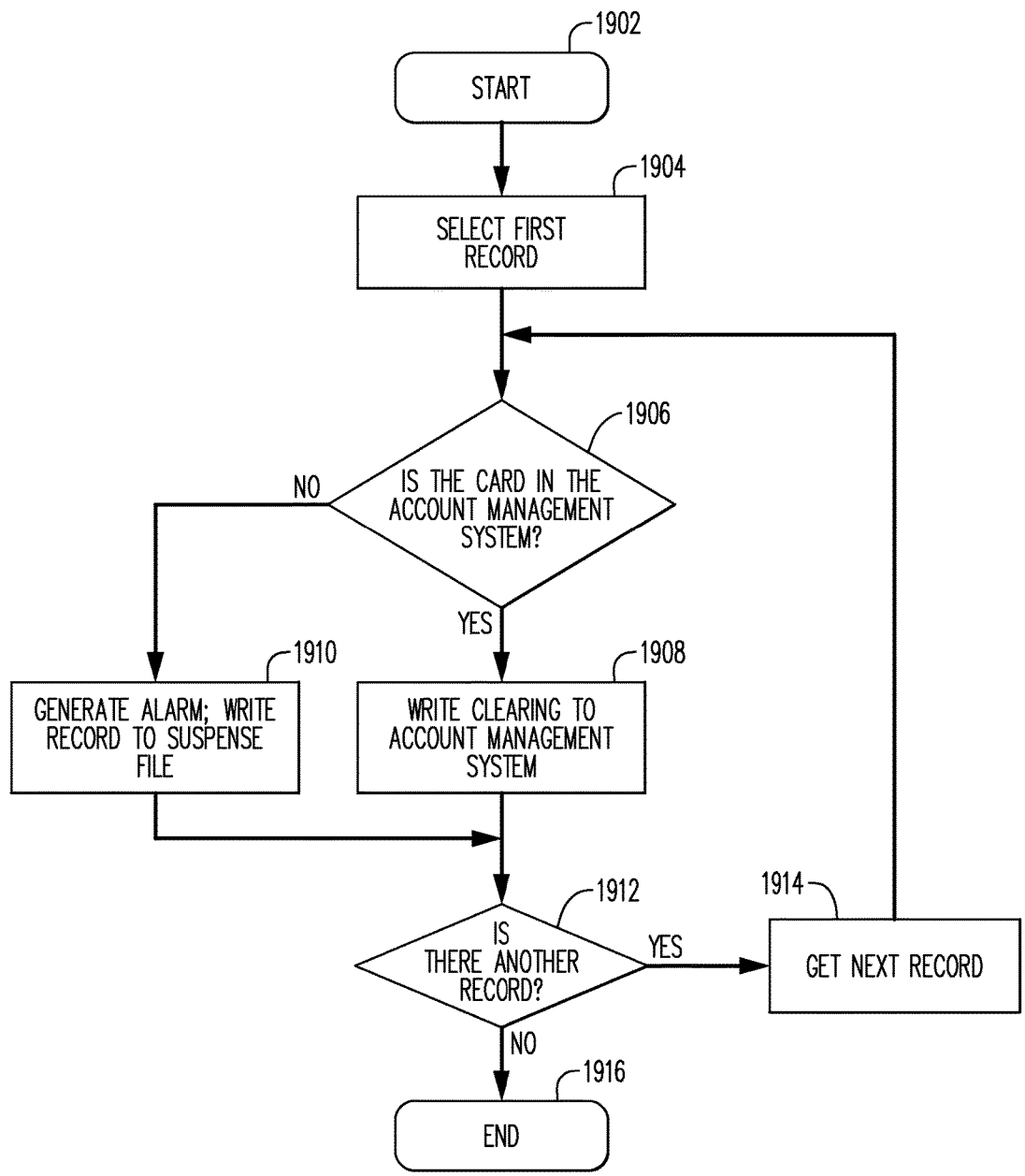
FIG. 19 is a flow chart that illustrates a process for clearing transactions performed by the cash card system host computer.

FIG. 19 is a flow chart that illustrates a process for clearing transactions performed by the cash card system host computer 208.

The process of FIG. 19 starts at 1902 and then advances to block 1904. At block 1904, the cash card system host computer 208 selects the first transaction record in a batch of transactions that has been submitted for clearing. Then, at decision block 1906, the cash card system host computer 208 determines whether the PAN included in the transaction record identifies a cash card for which an active account record is present in the account management system 554 (FIGS. 5A and 6). If so, then block 1908 follows decision block 1906. At block 1908, the transaction is entered against the cash card account record in question and is included for advisement to the card issuer and clearing of funds.

Considering decision block 1906 again, if it is determined in that decision block that there is no active account record for the PAN included in the transaction, then block 1910 follows decision block 1906. At block 1910, the cash card system host computer 208 generates an alarm to indicate that an invalid PAN has been submitted, and the current transaction record is written to a suspense file.

Decision block 1912 follows block 1908 or 1910, as the case may be. At decision block 1912, the cash card system host computer 208 determines whether there are any more records to be processed in the current batch of transaction records. If so, then at block 1914, the cash card system host computer 208 selects the next transaction record in the batch, and the process of FIG. 19 loops back from block 1914 to decision block 1906.

However, if at decision block 1912 the cash card system host computer 208 determines that there are no more records in the batch, then the process of FIG. 19 ends, as indicated at 1916.

In some embodiments, the cash card 202 may also include functionality for conventional credit and/or debit card purchase transactions. For example, the cash card 202 may store respective data objects (e.g., items 820-824 shown in FIG. 8A) related to a first application program for implementing pre-authorized, cleared payments, as described herein, and related to a second application program for implementing a conventional contact or contactless credit card transaction. The data object related to the first application may store (and make available for transmission to a POS terminal) a PAN that identifies the pre-authorized and cleared payment account, while the data object related to the second application may store and make available for transmission a conventional credit card account PAN. It will be recognized that the two PANs would be different from each other. The data object related to the second application program may alternatively store a PAN that identifies a conventional debit card account. The debit or credit card account may in some embodiments be the "linked" account referred to above, for example, in connection with FIG. 15. In some embodiments, each type of POS terminal or POS reader is operable only with one of the two applications, so that selection of one of the PANs/applications for a particular transaction occurs automatically as a consequence of the type of POS terminal/reader to which the card is presented. In other embodiments, a given POS terminal may be operable with either type of application. In some embodiments, the application/PAN to be used for a particular transaction may be selected by the cardholder actuating one or more switches (not shown) on the card itself. In other embodiments, the application/PAN to be used for a particular transaction may be selected by input to the POS terminal/reader. In still other embodiments (as described below for example in connection with FIG. 20), the POS terminal automatically selects the payment application to be used for a particular transaction.

Figure 20:
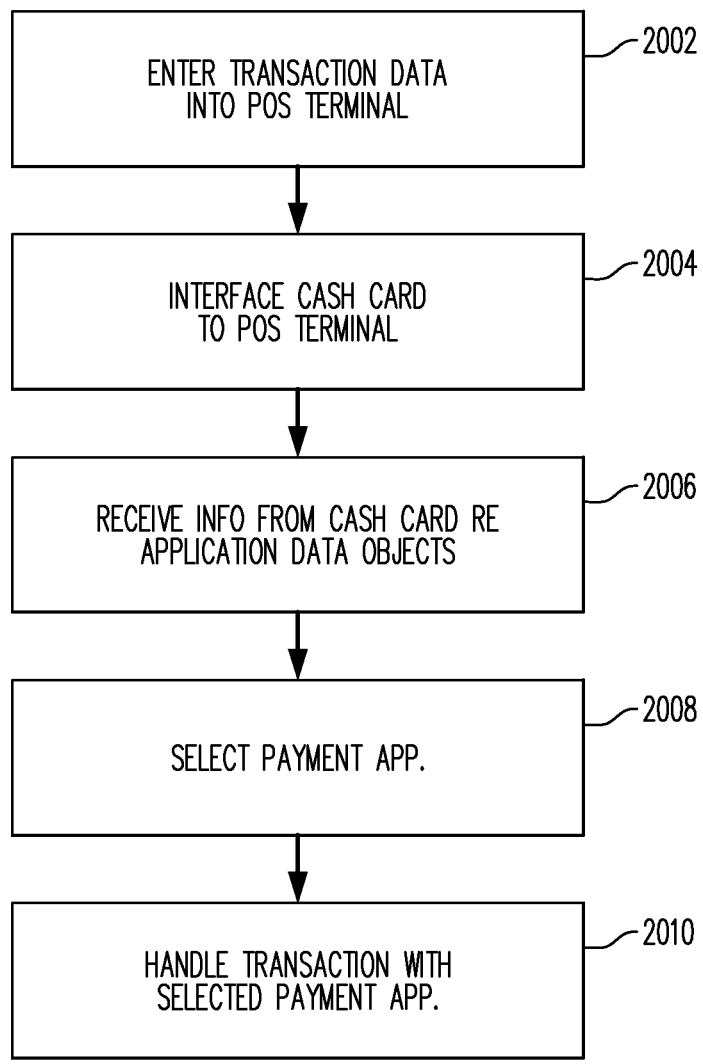
FIG. 20 is a flow chart that illustrates a process performed with the POS terminal of FIG. 9A.

FIG. 20 is a flow chart that illustrates a process performed with the POS terminal 404 (FIG. 9A).

At 2002 in FIG. 20, the employee of the merchant (i.e., the operator of the POS terminal 404) enters transaction data into the POS terminal 404. For example, the POS operator may use a barcode scanner interfaced to the POS terminal 404 to scan the product identification barcodes on one or more items that the cardholder wishes to purchase in connection with a purchase transaction. The POS operator may also interact with an operator interface of the POS terminal 404 to indicate that no more items are going to be included in the purchase transaction, so that the POS terminal 404 should calculate a total transaction amount (possibly including sales tax) for the purchase transaction.

At 2004, the cardholder or the POS operator may interface the cash card 202 to the card reader that is interfaced to the POS terminal 404. This may be done on a contactless or contact basis.

At 2006, the POS terminal 404 interrogates the cash card 202 and receives back from the cash card 202 information that identifies the payment-application-related data objects (e.g., the data objects 820, 822, 824—FIG. 8A) stored in the cash card 202.

At 2008, the POS terminal 404 determines which payment application it will use to handle the current purchase transaction. This may occur, for example, based on the information received at 2006, which information indicates to the POS terminal 404 which payment applications the cash card 202 is configured to operate with. The determination of step 2008 may also be based on the transaction information entered at 2002, including for example a total transaction amount calculated by the POS terminal 404 based on the transaction information entered at 2002. For example, the POS terminal 404 may retrieve a floor limit associated with one of its payment applications (for which the cash card 202 is configured, with the floor limit possibly being applicable to a certain type of transaction which corresponds to the current purchase transaction), and may compare the total transaction amount with the floor limit to select the particular payment application to be used for the current purchase transaction. From previous discussion, it will be understood that the payment applications available for selection by the POS terminal 404 may include a cash card payment application, a credit card payment application, a debit card payment application, and/or a loyalty program application.

Figure 20A:
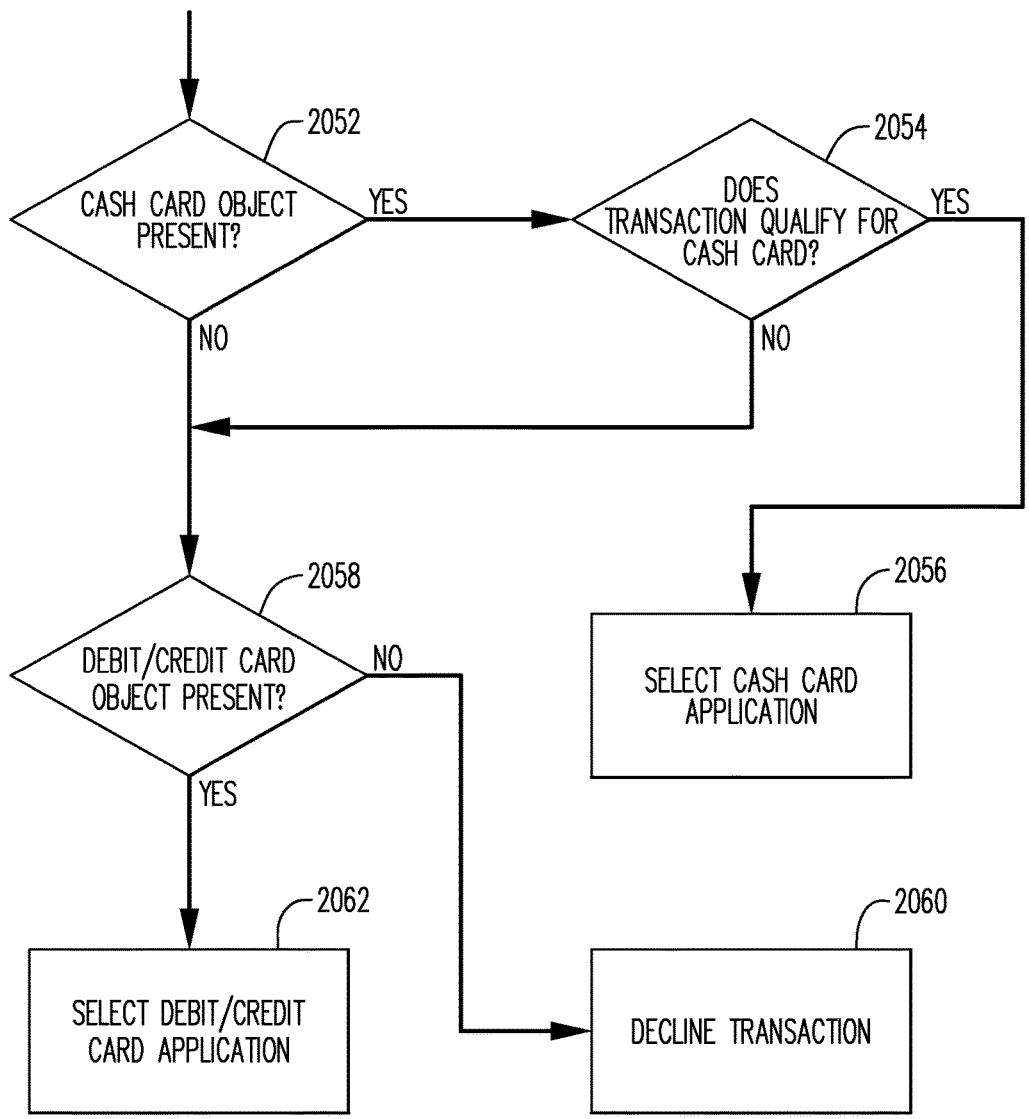
FIG. 20A is a flow chart that illustrates some details of the process of FIG. 20.

FIG. 20A is a flow chart that illustrates some details of step 2008 of FIG. 20.

At decision block 2052 in FIG. 20A, the POS terminal 404 determines whether a cash card object was indicated as being present in the cash card 202. If so, then decision block 2054 follows decision block 2052. At decision block 2054, the POS terminal 404 determines whether the current transaction qualifies for payment via a cash card payment application. This determination may, for example, be based on the amount of the transaction. For example, the transaction may qualify for payment via the cash card payment application if the transaction amount does not exceed a predetermined threshold amount.

If it is determined at decision block 2054 that the transaction qualifies for payment with the cash card payment application, then block 2056 follows decision block 2056. At block 2056, the POS terminal 404 selects the cash card payment application for use in the current transaction.

However, if a negative determination is made at decision block 2054 (i.e., if it is determined that the current transaction does not qualify for payment with the cash card payment application), then decision block 2058 follows decision block 2054. At decision block 2058, the POS terminal 404 determines whether it was indicated to the POS terminal 404 that a credit or debit card payment object was present in the cash card 202. If not, the POS terminal 404 may decline the transaction, as indicated by block 2060.

However, if a positive determination is made at decision block 2058 (i.e., if it is determined that a credit or debit card payment object was present in the cash card 202), then block 2062 follows decision block 2058. At block 2062, the POS terminal 404 selects a credit or debit card payment application (as the case may be) to process the transaction.

Referring again to decision block 2052, if a negative determination is made at that decision block (i.e., if no cash card payment object was indicated as present in the cash card 202), then decision block 2058 (as described above), follows decision block 2052.

It should be understood that the process of FIG. 20A is just one example of a number of different processes that may be employed in connection with step 2008 in FIG. 20, based, for example, on what types of payment objects may possibly be present in the cash card 202.

Referring again to FIG. 20, at 2010, the POS terminal 404 executes the selected payment application in handling the purchase transaction. For example, if the selection process results in the cash card application being selected, the POS terminal 404 may read the data object 820 in the cash card 202 to retrieve the PAN stored in the cash card 202 and stored as part of the data object 820. The POS terminal 404 may then include the PAN in the clearing file for the transaction, as described above. In other respects as well, including decrementing of the pre-authorized balance in the cash card 202 (associated with the data object 820), the transaction may proceed as described above, in connection with FIGS. 4 and 18.

In other situations, a debit or credit card application may be used by the POS terminal 404 to process the transaction, and the transaction may proceed substantially in the same manner as a conventional debit or credit card transaction. In still other cases, a loyalty card application or other application may be used. For example, the cash card 202 may store a data object associated with the loyalty card application and loyalty credits or "points" may be loaded into the card as an alternative currency that, if sufficient to pay for the transaction, may be used as payment instead of pre-authorized (cash card application) funds and/or instead of charging the transaction to the card holder's debit or credit card account.

Assuming that the cash card 202 stores more than one data object related to payment applications, it need not necessarily be the case that those data objects are the same as the data objects 820-824 shown in FIG. 8A. For example, the data objects may not include a data object related to the cash card application, in which case the IC payment card in question would more properly not be referred to as a "cash card" as that term is used herein.

Figure 21:
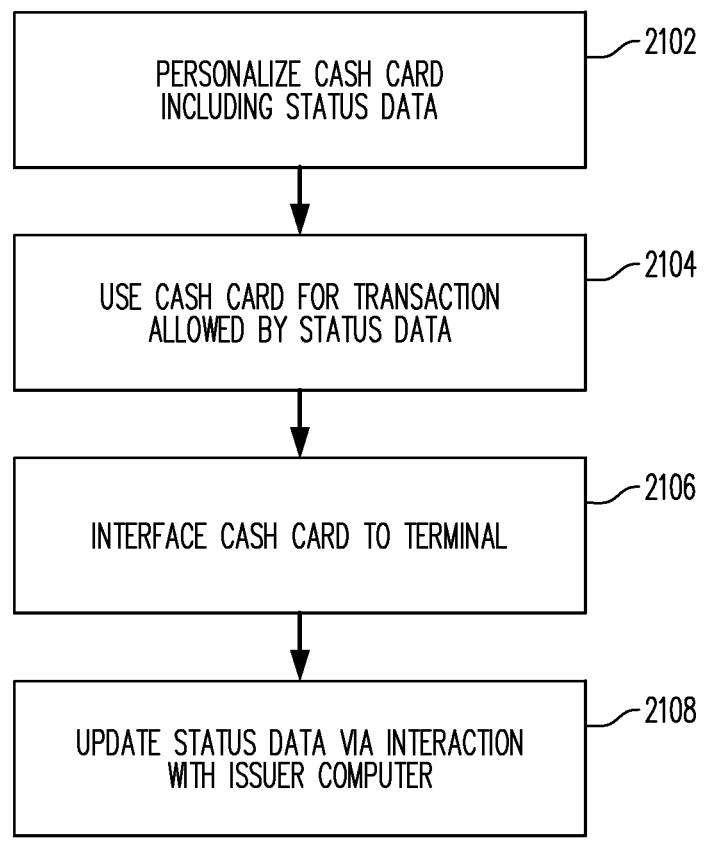
FIG. 21 is a flow chart that illustrates a process performed in the system of FIG. 1 in connection with status data stored in a cash card.

FIG. 21 is a flow chart that illustrates a process performed in the payment card system 100 in connection with status data stored in the cash card 202. In a sense, the process illustrated in FIG. 21 may be considered a more general version of the process discussed above in connection with FIG. 16.

At 2102 in FIG. 21, a personalization process is performed in connection with the cash card 202. For example, a cash card system PAN and other related data may be stored in the cash card 202 as part of the personalization process. The related data may for example include the above-described link status indicator or other status data related to use of the cash card 202 in connection with the cash card application or related to use of the cash card 202 in connection with another payment application.

From previous discussion, it will be understood that the link status indicator indicates whether the cash card 202 is qualified to be used in a linked load transaction. Other types of status data may indicate whether the cash card 202 qualifies for use in other types of transactions.

For example, one type of status data that may be stored in the cash card may be related to use of the cash card in connection with a debit card account that is funded by the cardholder's employer and that is accessible by a debit card application rather than by the cash card application. The employer may wish to limit the types of merchants at which the debit card account is to be used, and the corresponding status data may be used to enforce such a limitation. That is, the status data stored in the cash card 202 and related to the debit card application may indicate that the cash card is usable with the debit application only with merchants that fall within the categories of "restaurants" and "lodging", for example. If the cardholder were to attempt to use the cash card to access the debit card account for a transaction at, say, a liquor store or a casino, the status data may be read by the POS terminal at the merchant establishment in question and would result in the POS terminal declining the transaction. (In some embodiments, the POS terminal may itself make the determination as to whether the status data indicates that the card is qualified for the transaction. In other embodiments, the status data in question may be passed to the issuer of the debit card account so that the issuer is able to make the determination.) In still other embodiments, the cash card 202 itself may be programmed to determine whether the debit application is authorized for use for a given transaction. This determination may be based for example on information downloaded to the cash card 202 from the POS terminal 404 to indicate the identity and/or category of the merchant.

At 2104, the cash card 202 is interfaced to a POS terminal or load terminal to use the cash card 202 for a transaction of a type that the cash card is configured, by its stored status data, to engage in. For example, if the cash card stores status data that indicates that it is linked to a debit or credit account for the purposes of linked load transactions, then the transaction in question may be a linked load transaction. As another example, if the cash card stores status data that indicates that the cash card may access a company-funded debit card account for purchases of gasoline, the cash card may be interfaced to a POS terminal or payment-card-enabled gasoline pump at a gas station.

At 2106, the cash card 202 is interfaced to another terminal for the purpose of updating status data stored in the cash card 202. For example, this may occur if the cardholder has elected to close the debit or credit account used for linked load transactions. In this case, a bank employee may interface the cash card to a terminal at a bank branch to update the link status data to indicate that the cash card is "unlinked". As another example, administrative policies at the cardholder's employer may have changed to add convenience stores as a category of merchants for which the company-funded debit card account may be used. The cardholder may interface the cash card 202 to an ATM or other terminal to request an update of the status data to reflect the additional category of merchants at which the cash card may be used to access the debit card account.

At 2108, the cash card 202 exchanges communications (via the terminal to which it is interfaced at 2106) with the cash card system host computer 208 in order to receive a script to be executed by the cash card 202 for the purpose of updating the status data stored in the cash card 202. In some embodiments, for example, step 2108 may entail activities on the part of the cash card 202, the terminal and the cash card system host computer 208 that are the same as or similar to the processes described above in connection with FIGS. 16 and 17. It will be recognized that if the status data to be updated is not link status data, then a suitable script for updating the appropriate kind of a data is generated by the cash card system host computer 208 and transmitted to the cash card 202.

In an example described above, an employee carries a cash card 202 that is selectively usable with a debit application, where the employer controls setting of a status flag in the cash card to indicate what kinds of transactions are chargeable to the debit card account. In another example, the debit card account may be funded by a parent who wishes to control what types of transactions may be charged to the account via a cash card carried by a child (e.g., a college student). In this case, the parent may be able to control setting of the status flag in the cash card to indicate what types of transaction the POS terminal 404 should allow to be charged using the debit card application. For example, a certain status flag may indicate that the debit card account is usable only for books and/or only at the college bookstore. As the student becomes older and potentially more fiscally responsible, the parent may allow the status flag to be updated to permit usage of the debit card account at other retail outlets or for other types of purchases. For example, the employer or parent, as the case may be, may communicate with the issuer of the payment card account to request that the issuer update the status flag in the cash card via the cash card system host computer; the issuer may then communicate accordingly with the cash card system host computer.

The processes described above in connection with FIGS. 16 and 21 are examples of an aspect of the invention according to which a flag, an indicator, or other data or status data in an IC card may be updated to change the manner in which the IC card is or may be used. In another example, and as described in the above-referenced '060 patent application, an indicator may be updated to indicate that a transit access/payment card has risk mitigation information associated therewith. The risk mitigation information may include the cardholder's name and/or address and/or the account number for a financial account (e.g. a credit card account or a debit card account) that belongs to the cardholder. The setting/updating of the indicator may allow the transit card to be used as a token to initiate a charge to the credit or debit card account at a transit system entrance or exit, as an alternative to charging pre-paid/pre-authorized funds from the transit card. As a result, it may not be necessary for the cardholder to top up the transit card, given that a charge is instead made to the cardholder's credit or debit card account.

In general—for all of the examples given above and for other embodiments as well—the updating of the flag or indicator may involve changing its value from "0" to "1" or vice versa, or from "false" to "true" or vice versa. Alternatively, the indicator may indicate a category into which the IC card has been placed, among two, three or more categories (i.e., the indicator need not be limited to two values). In some embodiments, the indicator may define—to the POI terminal, to the card itself, and/or to a remote computer such as a card issuer's computer—what types of transactions the card is authorized and/or configured for use in.

Figure 22:
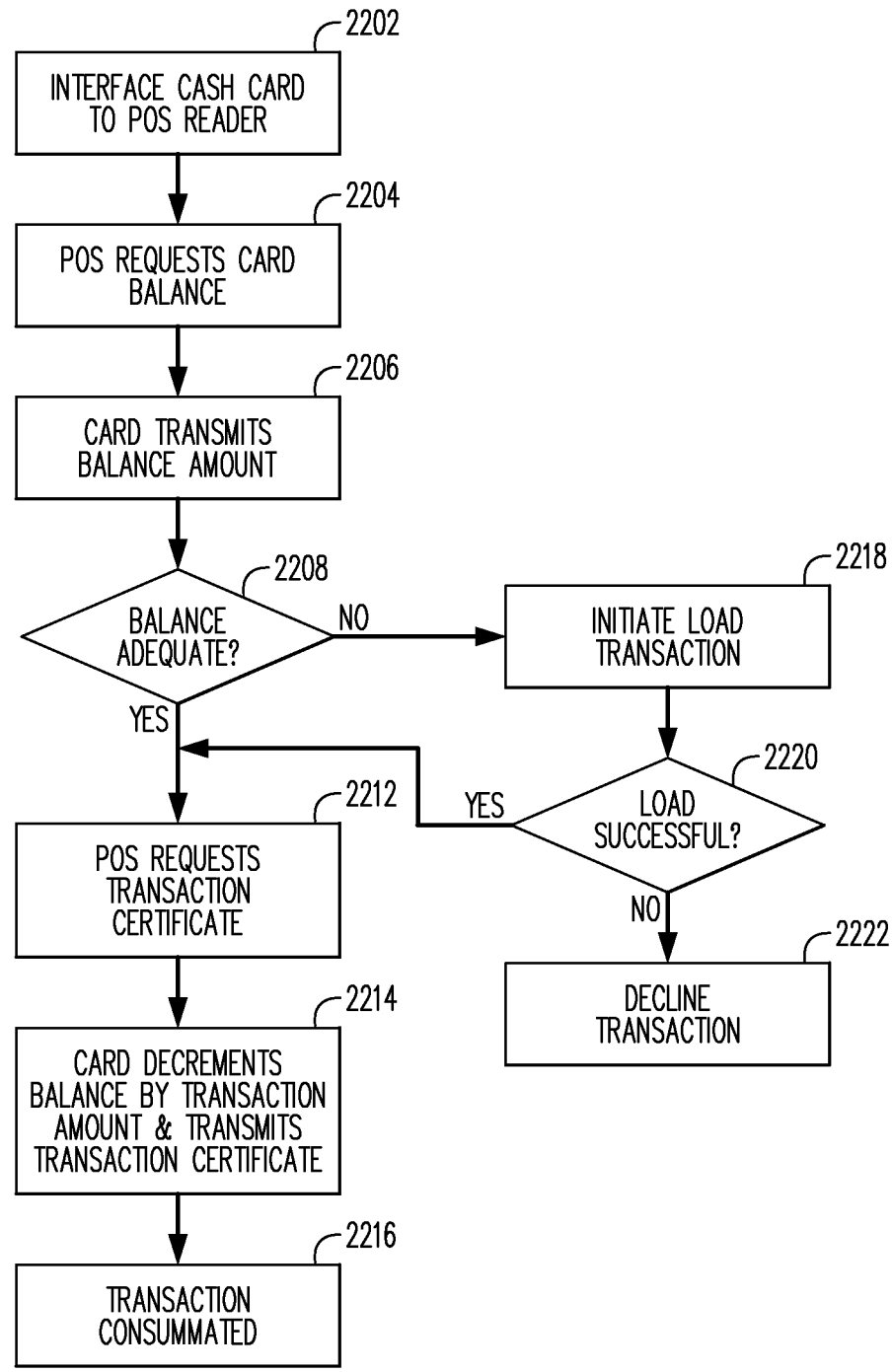
FIG. 22 is a flow chart that illustrates an alternative embodiment of the process of FIG. 18, including potentially an online load transaction.

FIG. 22 is a flow chart that illustrates an alternative embodiment of the off-line purchase transaction process of FIG. 18, including potentially an online load transaction. In the process of FIG. 22, the steps identified in the drawing by reference numerals 2202, 2204, 2206, 2208, 2212, 2214 and 2216 may be the same or substantially the same as steps 1802, 1804, 1806, 1808, 1812, 1814 and 1816 described above in connection with FIG. 18. However, in the process of FIG. 22, if a negative determination is made at decision block 2208 (i.e., if the POS terminal determines that the available balance of pre-authorized funds stored in the cash card 202 is not enough to support the transaction total amount determined by the POS terminal for the purchase transaction), then step 2218 follows step 2208. At step 2218, the POS terminal automatically initiates a load transaction for the cash card 202. This load transaction may, for example, be like the linked or unlinked load transactions described above in connection with FIGS. 3, 13, 14 and 15.

A decision block 2220 follows block 2218. At 2220 the POS terminal determines whether the load transaction was completed successfully. If so, then the process of FIG. 22 branches from decision block 2220 to blocks 2212-2216 to complete the off-line purchase transaction that was interrupted for the load transaction. If not, then the POS terminal declines the purchase transaction, as indicated at block 2222.

Figure 23A:
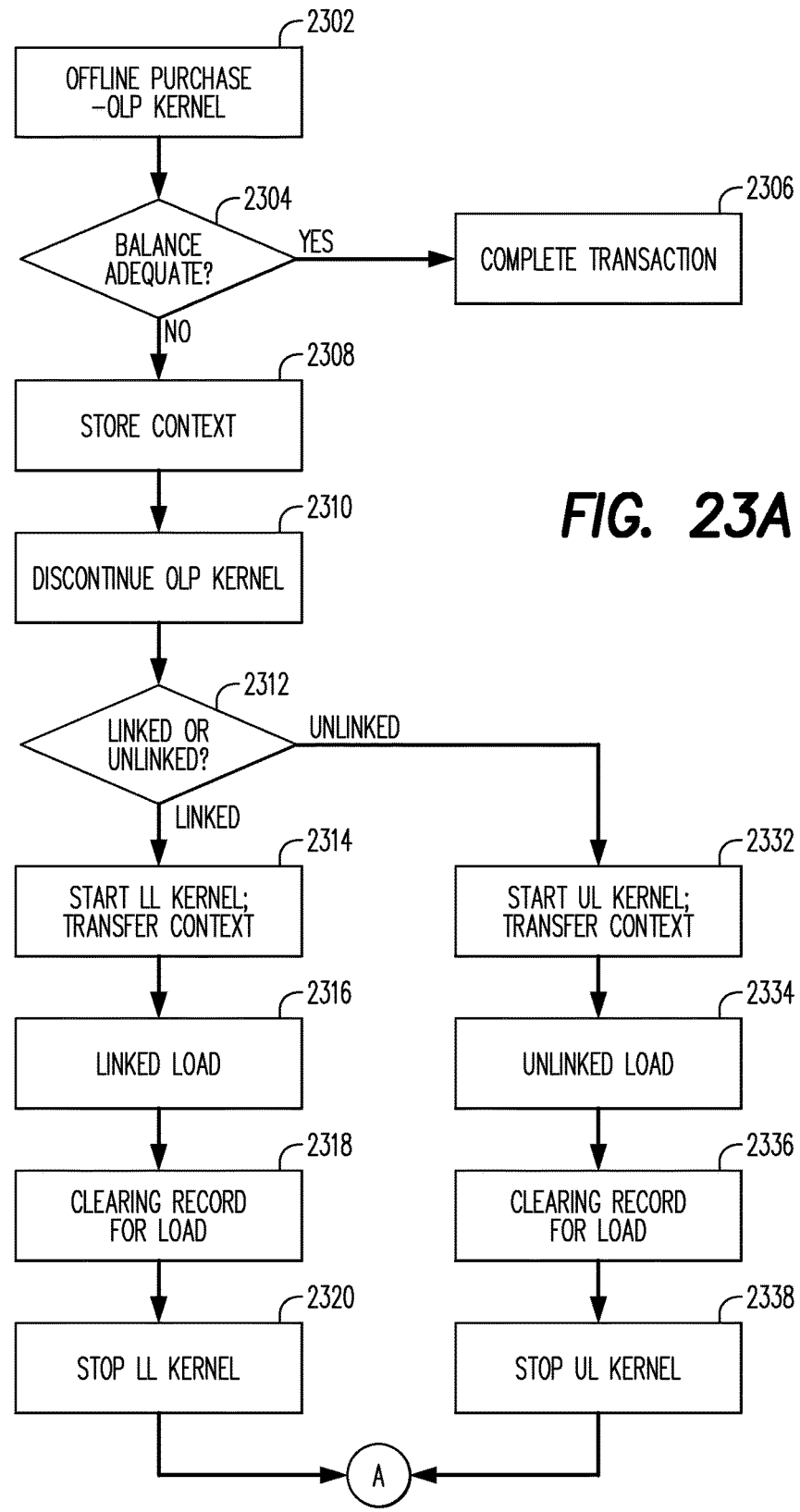
FIGS. 23A and 23B together form a flow chart that illustrates details of an embodiment of the process of FIG. 22.
Figure 23B:
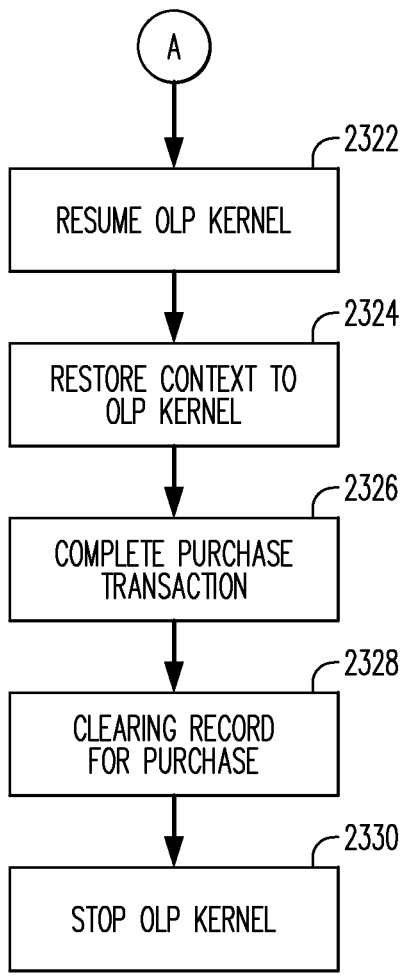

FIGS. 23A and 23B together form a flow chart that illustrates details of an embodiment of the process of FIG. 22. In the process of FIGS. 23A and 23B, the POS terminal may switch among payment-certified kernels such as the kernels 982, 984, 986 referred to above in connection with FIG. 9B. With the use of a cash card application that switches among certified kernels, it may not be necessary to test and certify the overlying cash card application as a whole, so that time to market for a cash card program may be reduced.

At 2302 in FIG. 23A, the POS terminal, under control of the cash card application 968 (FIG. 9B), commences handling an offline purchase transaction using the kernel 982. The kernel 982 does not require execution of any CVM (cardholder verification method).

At decision block 2304, the POS terminal determines whether the pre-authorized funds balance stored in the cash card is adequate in view of the total amount due for the transaction. If so, then the transaction is completed using the kernel 982, as indicated by block 2306 in FIG. 23A.

However, if the POS terminal makes a negative determination at decision block 2304 (i.e., if the pre-authorized funds balance is not adequate), then the process advances from decision block 2304 to block 2308. At block 2308, the cash card application stores the context for the current purchase transaction. The context may include, for example, the total amount for the transaction and the payment card account number stored (for cash card application transactions) in the cash card 202. Other data related to the transaction may also be included in the stored context.

At block 2310, the cash card application discontinues execution of the kernel 982. Decision block 2312 then follows block 2310. At decision block 2312, the POS terminal determines (e.g., based on link status data stored in the cash card 202) whether the cash card is linked to a debit or credit account, or is not linked to another account, for purposes of linked load transactions. If the cash card is linked to a debit or credit account, then block 2314 follows decision block 2312. At block 2314, the cash card application initiates execution of kernel 984, which handles linked load transactions with a CVM requirement that the cardholder enter his/her PIN and that the PIN be verified. The cash card application also transfers the stored context to the kernel 984.

Block 2316 follows block 2314. At block 2316 the kernel 984 is executed by the POS terminal in handling a linked load transaction (in a manner that is described above, but with entry of a PIN by the user, and verification of the PIN by the POS terminal 404 or by the card issuer). At block 2318, the POS terminal generates a clearing record for the linked load transaction, and at 2320, the cash card application stops execution of the kernel 984, now that the linked load transaction is complete.

Block 2322 (FIG. 23B) follows block 2320. At block 2322, the cash card application re-initiates execution of the kernel 982. Then, at block 2324, the cash card application restores the context of the purchase transaction (which was stored at 2308) to the kernel 982. Next, at 2326, by means of execution of the kernel 982, the offline purchase transaction is completed. At 2328, the POS terminal generates a clearing record for the offline purchase transaction, and at 2330 the cash card application ends execution of the kernel 982.

Considering again decision block 2312, if the POS terminal determines at that point in the process that the cash card 202 is not linked to a debit or credit account for purposes of linked load transactions, then the process advances from decision block 2312 to block 2332 (FIG. 23A). At 2332, the cash card application initiates execution of kernel 986, which handles unlinked load transactions without requiring compliance with any CVM. The cash card application also transfers the context (which was stored at 2308) to the kernel 986.

Block 2334 follows block 2332. At block 2334, the kernel 986 is executed by the POS terminal in handling an unlinked load transaction (in a manner that is described above). At block 2336, the POS terminal generates a clearing record for the unlinked load transaction, and at 2338, the cash card application stops execution of the kernel 986, with the unlinked load transaction having been completed.

From block 2238, the process advances to blocks 2322 through 2330 (FIG. 23B), which have previously been described. That is, the offline purchase agreement is completed, via renewed execution of kernel 982, after the unlinked load transaction is performed.

Reference was made hereinabove to cryptograms generated by the cash card 202 in connection with various transactions (including purchase and load transactions). Such cryptograms (also referred to as transaction certificates) are generated by the cash card, for example, with respect to steps 1202 and 1204 in FIG. 12, step 1404 in FIG. 14, steps 1606 and 1618 in FIG. 16 and step 1814 in FIG. 18. Such cryptograms are generated by the cash card by a cryptographic process and may reflect the pre-authorized funds balance in the cash card before and/or after the transaction in question. In accordance with aspects of the present invention, the cryptograms are transmitted to the cash card system host computer 208 as part of clearing files or in other ways, and are stored by the cash card system host computer 208 in association with the account records for the cash card in accordance with a process that is illustrated in FIG. 24.

Figure 24:
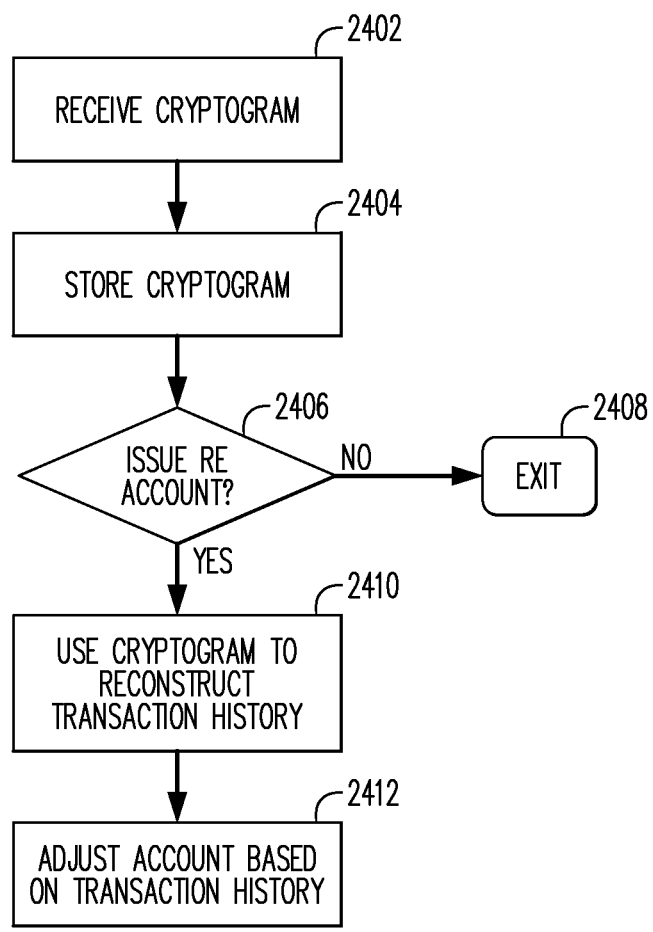
FIG. 24 is a flow chart that illustrates a process that may be performed with the cash card system host computer.

At step 2402 in FIG. 24, the cash card system host computer 208 receives a cryptogram that was generated by a cash card in connection with a transaction. At step 2404, the cash card system host computer 208 stores the cryptogram received at 2402 in the account records for the cash card (e.g., in the cash card account management system 554 (FIG. 5A) and/or in the account record data store 556).

Continuing to refer to FIG. 24, at decision block 2406, it is determined whether an issue of accuracy or of another sort has arisen with respect to the shadow account for the cash card or as to the pre-authorized balance stored in the cash card. If not, the process exits as indicated at 2408. However, if an issue arises, then block 2410 follows decision block 2406. At block 2410, the cash card system host computer 208 reconstructs a transaction history for the cash card based on the cryptogram stored at 2404, and possibly based on other cryptograms (for other transactions) that have been received and stored by the cash card system host computer 208 relative to the cash card in question. Then at 2412, the cardholder's account may be adjusted by the issuer based on the transaction history reconstructed at 2410.

At least some of the aspects of the present invention are also applicable to systems and/or IC payment cards that are not cash cards or cash card systems (i.e., which do not utilize pre-authorized and cleared funds).

Among other technical effects provided by this invention, a POS terminal that is selectively operable with a plurality of payment applications is programmed to automatically select from among the payment applications based on data provided by an IC payment card and based on transaction data input into the POS terminal.

In some embodiments, the cash card may be used for other applications, such as location access or customer loyalty, in addition to one or more payment applications.

Where the cash card is operable in one or more payment applications (e.g., to access a debit card account and/or a credit card account) in addition to the above-described pre-authorized and cleared payment application (the "cash card application"), there are a number of ways in which a particular one of the payment applications may be selected for a given transaction. In some embodiments, for example, the POS terminal or the cash card may automatically select the cash card application for transactions below a certain monetary amount limit and may select the credit or debit card application for transactions above the monetary amount limit. In other embodiments, the selection among payment applications may be made automatically based on the merchant's category code. In other embodiments, the user/POS terminal operator may be prompted by the POS terminal to select the application by manual input into the POS terminal.

In some embodiments, issuer functions described herein as being performed by the cash card system host computer 208 may alternatively be performed by the card issuer itself or by a computer operated on behalf of the issuer but other than the cash card system host computer 208.

In some embodiments described above, it has been assumed that the cash card and a linked credit or debit account used for linked load transactions are issued by the same financial institution. However, this need not necessarily be the case. That is, the cash card may be issued by one financial institution, and a linked account used for load transactions may be issued by a different financial institution.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account or a deposit account that the account holder may access using a debit card. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card or a debit card.

As used herein and in the appended claims, the term "payment card system" refers to a system for handling purchase transactions and related transactions and operated under the name of MasterCard, Visa, American Express, Diners Club, Discover Card or a similar system. In some embodiments, the term "payment card system" may be limited to systems in which member financial institutions issue payment card accounts to individuals, businesses and/or other organizations.

A transaction should be understood as being performed "on an on-line basis" if performing the transaction requires communication with a remote device. Conversely, a transaction should be understood as being performed "on an off-line basis" if performing the transaction does not require communication with a remote device.

Any block in a block diagram in the accompanying drawings that indicates an entity such as a merchant, an acquirer or an issuer should also be understood to represent one or more computers operated by or on behalf of such entity.

The term "issuer computer", as used in the appended claims, includes a computer operated by a card issuer, or a computer (such as the cash card system host computer) operated on behalf of a card issuer.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for handling a purchase transaction comprising:
   receiving, by a point of sale (POS) terminal, transaction data indicative of a purchase transaction, wherein the POS terminal operates in accordance with a plurality of payment applications stored in a memory;
   detecting, by a card interface associated with the POS terminal, the presence of an integrated circuit (IC) payment card, wherein the IC payment card stores a plurality of data objects that each includes a respective account number, and wherein each of the data objects corresponds to a respective one of the plurality of payment applications;
   receiving, by the POS terminal via the card interface from the IC payment card, indications of the plurality of data objects stored in the IC payment card;
   selecting, by the POS terminal, a cash card payment application from among the plurality of payment applications based at least in part on the transaction data and at least in part on the indications of the plurality of data objects received from the IC payment card;
   requesting, by the POS terminal via the card interface from the IC payment card, a current pre-authorized balance of the cash card payment application;
   determining, by the POS terminal, that the pre-authorized balance is sufficient to cover an amount due for the purchase transaction;
   requesting, by the POS terminal via the card interface from the IC payment card, a cryptogram reflecting the pre-authorized balance; and
   receiving, by the POS terminal from the IC payment card, the cryptogram to consummate the purchase transaction.

2. The method of claim 1, wherein selecting the cash card payment application further comprises, determining, by the POS terminal, that the amount due for the purchase transaction is less than a predetermined threshold amount.

3. The method of claim 1, further comprising, prior to receiving the indications of the plurality of data objects stored in the IC payment card:
   determining, by the POS terminal, that none of a cash card data object, a credit card object, or a debit card object is present; and
   declining, by the POS terminal, the purchase transaction.

4. The method of claim 1, wherein selecting the cash card payment application from among the plurality of payment applications comprises comparing, by the POS terminal, a total amount of the purchase transaction with a transaction type floor limit.

5. The method of claim 1, wherein the plurality of payment applications include the cash card payment application and at least one of a credit card payment application, a debit card payment application, a loyalty card payment application, and a transit system access application.

6. The method of claim 1, wherein the IC payment card operates in accordance with the EMV standard.

7. The method of claim 1, wherein each of the payment applications comprises executable program code instructions stored in the memory.

8. A point of sale (POS) terminal for handling purchase transactions, comprising:
   a POS terminal processor;

a device interface operably connected to the POS terminal processor;

a card interface component operably connected to the POS terminal processor for communicating with an integrated circuit (IC) payment card;

a memory operably connected to the POS terminal processor and storing a plurality of payment applications, wherein the memory also stores instructions configured to cause the POS terminal processor to:

receive transaction data indicative of a purchase transaction via the device interface;

detect the presence of an IC payment card via the card interface component, wherein the IC payment card stores a plurality of data objects that each includes a respective account number, and wherein each of the data objects corresponds to a respective one of the plurality of payment applications;

receive, via the card interface from the IC payment card, indications of the plurality of data objects stored in the IC payment card;

select a cash card payment application from among the plurality of payment applications based at least in part on the transaction data and at least in part on the indications of the plurality of data objects;

request, via the card interface from the IC payment card, a current pre-authorized balance of the cash card payment application;

determine that the pre-authorized balance is sufficient to cover an amount due for the purchase transaction;

request, from the IC payment card, a cryptogram reflecting the pre-authorized balance; and receive, from the IC payment card, the cryptogram to consummate the purchase transaction.

9. The apparatus of claim 8, wherein the memory also stores a plurality of payment profile subprograms, each of the subprograms certified as compliant with a payment processing standard that applies to the POS terminal, wherein a first subprogram operates to handle an offline purchase transaction without requiring a cardholder verification method (CVM), and a second subprogram operates to handle an online load transaction requiring a CVM and verification of the CVM by a remote computer; and wherein the POS terminal processor is operative with the cash card payment application program to switch among the plurality of payment profile subprograms while the IC payment card is interfaced to the card interface component.

10. The apparatus of claim 9, wherein the plurality of subprograms comprises the first subprogram, the second subprogram, and a third subprogram for handling an online load transaction that does not require entry of a CVM.

11. The apparatus of claim 10, wherein the POS terminal processor is operative with the cash card payment application to:

initiate an offline purchase transaction with the IC payment card interfaced to the card interface component using the first subprogram;

determine that a pre-authorized balance stored in the IC payment card is less than a total amount for the purchase transaction;

store a context for the purchase transaction, the context including the total amount for the purchase transaction and a payment card account number associated with and retrieved from the IC payment card;

discontinue execution of the first subprogram;

initiate execution of the third subprogram;

transfer at least part of the stored context to the third subprogram; and execute an online load transaction using the third subprogram, the online load transaction increasing a pre-authorized balance stored in the IC payment card using a script received from a remote computer.

12. The apparatus of claim 11, wherein the POS terminal processor is further operative with the cash card payment application to:

establish a first clearing record, the first clearing record for clearing the online load transaction;

discontinue execution of the third subprogram;

resume execution of the first subprogram;

provide at least part of the stored context to the first subprogram;

complete the offline purchase transaction using the first subprogram;

establish a second clearing record, the second clearing record for clearing the offline purchase transaction; and discontinue execution of the first subprogram.

13. The apparatus of claim 12, wherein the POS terminal processor is further operative with the cash card payment application to:

initiate an offline purchase transaction with the IC payment card interfaced to the card interface component and using the first subprogram;

determine that a pre-authorized balance stored in the IC payment card is less than a total amount for the purchase transaction;

store a context for the purchase transaction, the context including the total amount for the purchase transaction and a payment card account number associated with and retrieved from the IC payment card;

discontinue execution of the first subprogram;

initiate execution of the second subprogram;

transfer at least part of the stored context to the second subprogram;

execute an online load transaction using the second subprogram, the online load transaction increasing the pre-authorized balance stored in the IC payment card using a script received from a remote computer, wherein funding for the online load transaction is obtained from one of a debit or credit account linked to the IC payment card;

establish a first clearing record, the first clearing record for clearing the online load transaction;

discontinue execution of the second subprogram;

resume execution of the first subprogram;

provide at least part of the stored context to the first subprogram;

complete the offline purchase transaction using the first subprogram;

establish a second clearing record to clear the offline purchase transaction; and discontinue execution of the first subprogram.

* * * * *